United States Patent
Yu et al.

(10) Patent No.: US 12,520,320 B2
(45) Date of Patent: Jan. 6, 2026

(54) PHYSICAL UPLINK CONTROL CHANNEL SENDING METHOD, RECEIVING METHOD, AND COMMUNICATION APPARATUS

(71) Applicant: HUAWEI TECHNOLOGIES CO., LTD., Guangdong (CN)

(72) Inventors: Zheng Yu, Beijing (CN); Jianghua Liu, Beijing (CN); Ronghui Wen, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 18/164,562

(22) Filed: Feb. 3, 2023

(65) Prior Publication Data

US 2023/0262709 A1 Aug. 17, 2023

Related U.S. Application Data

(63) Continuation of application No. PCT/CN2022/084672, filed on Mar. 31, 2022.

(30) Foreign Application Priority Data

Apr. 2, 2021 (CN) .................... 202110363575.X
Nov. 5, 2021 (CN) .................... 202111308908.5

(51) Int. Cl.
*H04W 72/21* (2023.01)
*H04B 1/713* (2011.01)
*H04L 5/00* (2006.01)

(52) U.S. Cl.
CPC ............ *H04W 72/21* (2023.01); *H04B 1/713* (2013.01); *H04L 5/0053* (2013.01)

(58) Field of Classification Search
CPC ....... H04W 72/21; H04B 1/713; H04L 5/0053
(Continued)

(56) References Cited

U.S. PATENT DOCUMENTS

2019/0222254 A1* 7/2019 Kim ......................... H04L 5/10
2019/0394757 A1* 12/2019 Zhang ................. H04W 72/044
2021/0083913 A1 3/2021 Matsumura et al.

FOREIGN PATENT DOCUMENTS

CN 109511171 A 3/2019
CN 109586878 A 4/2019
(Continued)

OTHER PUBLICATIONS

Motorola Mobility et al., "PUCCH resource allocation", 3GPP TSG RAN WG1 #90bis Prague, Czech Republic, Oct. 9-13, 2017,R1-1718702, total 6pages.
(Continued)

*Primary Examiner* — Chi Tang P Cheng

(57) ABSTRACT

This application discloses a physical uplink control channel sending method, a receiving method, and a communication apparatus. The method includes: A terminal device determines a first transmission manner from a plurality of transmission manners including a first non-frequency hopping transmission manner, and sends a PUCCH to a network device in the first transmission manner. The first non-frequency hopping transmission manner is: sending the PUCCH without frequency hopping in a time unit. UCI on the PUCCH includes a first part and a second part, the first part is sent by using an orthogonal sequence whose length is L1, and the second part is sent by using an orthogonal sequence whose length is L2. The UCI is divided into two parts, and is sent without frequency hopping by using orthogonal sequences with a same length or different lengths.

20 Claims, 8 Drawing Sheets

(58) Field of Classification Search
USPC ........................................................ 370/329
See application file for complete search history.

(56) References Cited

FOREIGN PATENT DOCUMENTS

| CN | 109803407 A | 5/2019 |
|---|---|---|
| CN | 109905914 A | 6/2019 |
| CN | 110035550 A | 7/2019 |
| CN | 112449420 A | 3/2021 |
| CN | 110870364 B | 7/2022 |
| JP | 2019062442 A | 4/2019 |
| JP | 2019528597 A | 10/2019 |
| WO | 2017028042 A1 | 2/2017 |
| WO | 2019159343 A1 | 8/2019 |
| WO | 2019163111 A1 | 8/2019 |

OTHER PUBLICATIONS

3GPP TSG-RAN WG1 Meeting #99 R1-1912708 "UL signals and channels for NR-U", Ericsson, Reno, NV, USA, Nov. 18-22, 2019, total 24 pages.

3GPP TS 38.213 V16.5.0 (Mar. 2021) 3rd Generation Partnership Project; Technical Specification Group Radio Access Network;NR;Physical layer procedures for control (Release 16), total 183 pages.

Huawei, HiSilicon et al.,"Reduced maximum UE bandwidth", 3GPP TSG RAN WG1 Meeting #107-e e-Meeting, Nov. 11-19, 2021, R1-2110801, total 14pages.

3rd Generation Partnership Project; Technical Specification Group Radio Access Network; NR;Physical channels and modulation (Release 17), 3GPP TS 38.211 V17.0.0 (Dec. 2021), 3GPP TS 38.211 V17.0.0 (Dec. 2021), total: 134pages.

3rd Generation Partnership Project; Technical Specification Group Radio Access Network; NR;Physical layer procedures for control(Release 17),3GPP TS 38.213 V17.0.0 (Dec. 2021), 3GPP TS 38.213 V17.0.0 (Dec. 2021), total: 141pages.

Ericsson et al.,"Introduction of RedCap",3GPP TSG-RAN2 Meeting #117-e,Online, Feb. 21, 2022-Mar. 3, 2021, R2-2203557,total:588pages.

Moderator (Ericsson) et al.,"FL summary #3 on reduced maximum UE bandwidth for RedCap",3GPP TSG-RAN WG1 Meeting #107-e,e-Meeting, Nov. 11-19, 2021, R1-2112499, total:143pages.

Moderator (Ericsson) et al.,"FL summary on RAN1 RRC parameter list for Rel-17 NR RedCap",3GPP TSG-RAN WG1 Meeting #108-e,e-Meeting, Feb. 21-Mar. 3, 2022, R1-2202533, total:5pages.

* cited by examiner

PHYSICAL UPLINK CONTROL CHANNEL SENDING METHOD, RECEIVING METHOD, AND COMMUNICATION APPARATUS

CROSS-REFERENCE TO RELATED APPLICATIONS

This application is a continuation of International Application No. PCT/CN2022/084672, filed on Mar. 31, 2022, which claims priorities to Chinese Patent Application No. 202111308908.5, filed on Nov. 5, 2021, and Chinese Patent Application No. 202110363575.X, filed on Apr. 2, 2021. All of the aforementioned patent applications are hereby incorporated by reference in their entireties.

TECHNICAL FIELD

This application relates to the field of communication technologies, and in particular, to a physical uplink control channel (PUCCH) sending method and receiving method, and a communication apparatus.

BACKGROUND

Usually, when a terminal device receives or sends information within a frequency range that does not exceed a maximum channel bandwidth capability of the terminal device, frequency retuning does not need to be performed. However, if the terminal device receives or sends information within a frequency range that exceeds the maximum channel bandwidth capability of the terminal device, the terminal device needs to perform frequency retuning to receive or send information within a larger frequency range.

For a reduced capability terminal device, for example, a massive machine-type communications (mMTC) device, a bandwidth capability of the reduced capability terminal device is limited. When the reduced capability terminal device sends a PUCCH within a frequency range that exceeds a maximum channel bandwidth capability of the reduced capability terminal device, the reduced capability terminal device needs duration of M symbols for frequency retuning. Therefore, the PUCCH cannot be transmitted in the tuning duration of M symbols, causing degraded PUCCH transmission performance of the reduced capability terminal device. In addition, if the reduced capability terminal device and a normal terminal (for example, an enhanced mobile broadband (eMBB) device) share a PUCCH channel on a same resource, because the M symbols cannot be used to transmit a PUCCH of the reduced capability terminal device, but can be used to transmit a PUCCH of the normal terminal device, orthogonality between PUCCH transmission of the reduced capability terminal device and PUCCH transmission of the normal terminal device cannot be ensured. The PUCCH transmission of the reduced capability terminal device interfere with PUCCH transmission of the normal terminal device, causing degraded PUCCH transmission performance of the normal terminal device.

SUMMARY

This application provides a PUCCH sending method, a receiving method, and a communication apparatus, to reduce degraded PUCCH transmission performance of a reduced capability terminal device, and reduce impact of PUCCH transmission of a reduced capability terminal device on PUCCH transmission of a normal device.

According to a first aspect, a PUCCH sending method is provided. The method may be performed by a first communication apparatus. The first communication apparatus may be a communication device or a communication apparatus, for example, a chip system, that can support the communication device in implementing a function required in the method. An example in which the communication device is a terminal device is used below for descriptions. The method includes the following steps.

A terminal device determines a first transmission manner from a plurality of transmission manners, and sends a PUCCH in the first transmission manner. The plurality of transmission manners include a first non-frequency hopping transmission manner and/or an inter-time unit frequency hopping transmission manner; or the plurality of transmission manners include a second non-frequency hopping transmission manner and an intra-time unit frequency hopping transmission manner, and the plurality of transmission manners do not include the first non-frequency hopping transmission manner.

The first non-frequency hopping transmission manner is: sending the PUCCH without frequency hopping in a time unit, where uplink control information (UCI) on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a demodulation reference signal (DMRS) on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In this embodiment of this application, it may be considered that, based on the second non-frequency hopping transmission manner and the intra-time unit frequency hopping transmission manner, two new PUCCH transmission manners are additionally provided: the first non-frequency hopping transmission manner and the inter-time unit frequency hopping transmission manner. For the inter-time unit frequency hopping transmission manner, it is specified that there are a specific quantity of symbols between the first hop and the second hop of the PUCCH, and the specific quantity of symbols may be used for frequency retuning. In this way, even if a reduced capability terminal device sends or receives a PUCCH within a frequency range that exceeds a maximum channel bandwidth capability of the reduced capability terminal device, frequency retuning may be performed in a specific quantity of symbols, and PUCCH transmission is not affected. In this way, degraded PUCCH transmission performance of the reduced capability terminal device can be avoided. For the first non-frequency hopping transmission manner, because the UCI and the DMRS on the PUCCH are separately divided into two parts, the UCI and the DMRS are sent without frequency hopping by using orthogonal sequences with a same length or different lengths. Even if a normal terminal device and a reduced capability terminal device share a PUCCH resource, the normal terminal device and the reduced capability terminal device can still use orthogonal sequences for PUCCH transmission, to avoid interference to PUCCH transmission of the normal device, and ensure PUCCH transmission performance of the normal terminal device.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission; or the plurality of transmission manners include the first non-frequency hopping transmission manner, the second non-frequency hopping transmission manner, the intra-time unit frequency hopping transmission manner, and the inter-time unit frequency hopping transmission manner; or the plurality of transmission manners include at least the second non-frequency hopping transmission manner and the intra-time unit frequency hopping transmission manner. For example, the plurality of transmission manners include the second non-frequency hopping transmission manner and the intra-time unit frequency hopping transmission manner, and the plurality of transmission manners do not include the first non-frequency hopping transmission manner. It may be understood that embodiments of this application provide two new PUCCH transmission manners: the first non-frequency hopping transmission manner and the inter-time unit frequency hopping transmission manner. The second non-frequency hopping transmission manner and the intra-time unit frequency hopping transmission may be considered as two existing PUCCH transmission manners. To be compatible with the existing PUCCH transmission manners, the first transmission manner may be selected from the existing PUCCH transmission manners and the new PUCCH transmission manners provided in embodiments of this application.

In an implementation, determining the first transmission manner from the plurality of transmission manners includes:
determining the first transmission manner from the plurality of transmission manners based on first indication information and/or a pre-specified rule, where the first indication information indicates the first transmission manner.

This embodiment of this application provides two methods for determining the first transmission manner. For example, the first transmission manner may be determined from the plurality of transmission manners based on the first indication information. This is simple and direct. For another example, the first transmission manner may be determined from the plurality of transmission manners according to the pre-specified rule, and no signaling exchange is needed. This reduces signaling overheads.

In an implementation, the first indication information indicates at least one of the following:
the first non-frequency hopping transmission manner, the second non-frequency hopping transmission manner, the intra-time unit frequency hopping transmission manner, and the inter-time unit frequency hopping transmission manner.

The first indication information may occupy one or more bits, to indicate the first transmission manner from the plurality of transmission manners. For example, the plurality of transmission manners are two transmission manners. The first indication information may occupy 1 bit, and different bit states indicate different transmission manners. Certainly, the first indication information may also occupy a plurality of bits. In addition to indicating the first transmission manner, the first indication information may further indicate other information, for example, a resource block (RB) index of the PUCCH. For example, for the second non-frequency hopping transmission manner, there may be a plurality of manners of determining the RB index of the PUCCH, and the first indication information may occupy a plurality of bits to indicate that the first transmission manner is the second non-frequency hopping transmission manner and indicate the RB index of the PUCCH. Because the first indication information may indicate both the first transmission manner and the RB index of the PUCCH, signaling overheads can be reduced.

In an implementation, the first transmission manner is the second non-frequency hopping transmission manner, and the method further includes: The terminal device obtains, based on the first indication information, a rule used for determining an RB location of the PUCCH, where the first indication information indicates the used rule from a plurality of rules.

For example, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and/or $X/2 \leq r_{PUCCH} \leq X-1$ and the RB index value of the PUCCH is equal to $N_{BWP}^{size}-1-RB_{BWP}^{offset}-\lfloor r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size}-1-RB_{BWP}^{offset}-\lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured, and X is an integer.

In an implementation, the method further includes:
determining indexes of orthogonal sequences whose lengths are Li and Lj, where i=1, 2, 3, 4, 5, or 6, and j=1, 2, 3, 4, 5 or 6; and if i=j, determining the index of the orthogonal sequence whose length is Li and the index of the orthogonal sequence whose length is Lj based on first index indication information; or
if i≠j, determining the index of the orthogonal sequence whose length is Li based on second index indication information, and determining the index of the orthogonal sequence whose length is Lj based on third index indication information.

It should be understood that indexes of two orthogonal sequences with a same length may be the same. Therefore, an index of one orthogonal sequence may be determined, to determine an index of the other orthogonal sequence. In this case, one piece of index indication information may be used to indicate indexes of two orthogonal sequences with a same length, and no more index indication information is needed. This reduces signaling exchange. Indexes of two orthogonal sequences with different lengths may be the same or may be different. Therefore, for two orthogonal sequences with different lengths, corresponding indexes may be respectively indicated by using two pieces of index indication information.

In an implementation, the method further includes: sending first capability information to a network device. The first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

The network device may indicate, based on the capability information reported by the terminal device, a PUCCH transmission manner used by the terminal device and a rule used for determining the RB index of the PUCCH, to ensure that the PUCCH transmission manner configured or indicated for the terminal device matches an actual capability of the terminal device.

According to a second aspect, a PUCCH receiving method is provided. The method may be performed by a second communication apparatus. The second communication apparatus may be a communication device or a communication apparatus, for example, a chip or a chip system, that can support the communication device in implementing a function required in the method. An example in which the communication device is a network device is used below for descriptions. The method includes the following steps.

A network device generates first indication information, and sends the first indication information. The first indication information indicates a first transmission manner from a plurality of transmission manners, and the plurality of transmission manners include a first non-frequency hopping transmission manner, or the plurality of transmission manners include an inter-time unit frequency hopping transmission manner; or the plurality of transmission manners include at least a second non-frequency hopping transmission manner and an intra-time unit frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission manner; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an implementation, the first indication information indicates at least one of the following:
the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and the first indication information further indicates, from a plurality of rules, a rule used for determining a resource block RB location of the PUCCH.

In an implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and/or $X/2 \leq r_{PUCCH} \leq X-1$, and the RB index value of the PUCCH is equal to $N_{BWP}^{size} - 1 - RB_{BWP}^{offset} - \lfloor (r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size} - 1 - RB_{BWP}^{offset} - \lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{size}$ is a size of a bandwidth part BWP on which the PUCCH resource is configured, and X is an integer.

In an implementation, the method further includes:
sending first index indication information, where the first index indication information indicates an orthogonal sequence whose length is Li and an orthogonal sequence whose length is Lj, i=1, 2, 3, 4, 5 or 6, j=1, 2, 3, 4, 5 or 6, and i=j; or
sending second index indication information and third index indication information, where the second index indication information indicates an orthogonal sequence whose length is Li, and the third index indication information indicates an orthogonal sequence whose length is Lj, i=1, 2, 3, 4, 5 or 6, j=1, 2, 3, 4, 5 or 6, and i≠j.

In an implementation, the method further includes: receiving first capability information from a terminal device.

The first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

In an implementation, generating the first indication information includes:

generating the first indication information based on the first capability information.

For technical effects brought by the second aspect or the implementations of the second aspect, refer to the descriptions of the technical effects of the first aspect or the implementations of the first aspect.

According to a third aspect, an embodiment of this application provides a communication apparatus. The communication apparatus may be a communication device on a terminal side or a communication apparatus, for example, a chip or a chip system, that can support a communication device on a terminal side in implementing a function required in the method. The communication apparatus may include a processing module and a transceiver module. The processing module is configured to determine a first transmission manner from a plurality of transmission manners. The transceiver module is configured to send a PUCCH in the first transmission manner. The plurality of transmission manners include a first non-frequency hopping transmission manner and/or an inter-time unit frequency hopping transmission manner; or the plurality of transmission manners include a second non-frequency hopping transmission manner and an intra-time unit frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an implementation, the processing module is configured to:

determine the first transmission manner from the plurality of transmission manners based on first indication information and/or a pre-specified rule, where the first indication information indicates the first transmission manner.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission; or the plurality of transmission manners include the first non-frequency hopping transmission manner, the second non-frequency hopping transmission manner, the intra-time unit frequency hopping transmission manner, and the inter-time unit frequency hopping transmission manner; or the plurality of transmission manners include at least the second non-frequency hopping transmission manner and the intra-time unit frequency hopping transmission manner, for example, the plurality of transmission manners include the second non-frequency hopping transmission manner and the intra-time unit frequency hopping transmission manner, and the plurality of transmission manners do not include the first non-frequency hopping transmission manner.

In an implementation, the first indication information indicates at least one of the following:

the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and the processing module is further configured to obtain, based on the first indication information, a rule used for determining an RB index of the PUCCH, where the first indication information indicates the used rule from a plurality of rules.

In an implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and/or $X/2 \leq r_{PUCCH} \leq X-1$, and the RB index value of the PUCCH is equal to $N_{BWP}^{size} - 1 - RB_{BWP}^{offset} - \lfloor r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size} - 1 - RB_{BWP}^{offset} - \lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured, and X is an integer.

In an implementation, the processing module is further configured to:

determine indexes of orthogonal sequences whose lengths are Li and Lj, where i=1, 2, 3, 4, 5, or 6, and j=1, 2, 3, 4, 5 or 6; and if i=j, determine the index of the orthogonal sequence whose length is Li and the index of the orthogonal sequence whose length is Lj based on first index indication information; or if i≠j, determine the index of the orthogonal sequence whose length is Li based on second index indication information, and determine the index of the orthogonal sequence whose length is Lj based on third index indication information.

In an implementation, the transceiver module is further configured to:
send first capability information to a network device, where the first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

According to a fourth aspect, an embodiment of this application provides a communication apparatus. The communication apparatus may be a communication device on a network side or a communication apparatus, for example, a chip or a chip system, that can support a communication device on a network side in implementing a function required in the method. The communication apparatus may include a processing module and a transceiver module. The processing module is configured to generate first indication information. The transceiver module is configured to send the first indication information. The first indication information indicates a first transmission manner from a plurality of transmission manners. The plurality of transmission manners include a first non-frequency hopping transmission manner; or the plurality of transmission manners include an inter-time unit frequency hopping transmission manner; or the plurality of transmission manners include a second non-frequency hopping transmission manner and an intra-time unit frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission manner; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an implementation, the first indication information indicates at least one of the following:
the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and a rule used for determining a resource block RB location of the PUCCH is determined from a plurality of rules.

In an implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and or $X/2 \leq r_{PUCCH} \leq X-1$, and the RB index value of the PUCCH is equal to $N_{BWP}^{size}-1-RB_{BWP}^{offset}-\lfloor (r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size}-1-RB_{BWP}^{offset}-\lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{size}$ is a size of a bandwidth part BWP on which the PUCCH resource is configured, and X is an integer.

In an implementation, the transceiver module is further configured to:
send first index indication information, where the first index indication information indicates an orthogonal sequence whose length is Li and an orthogonal sequence whose length is Lj, i=1, 2, 3, 4, 5 or 6, j=1, 2, 3, 4, 5 or 6, and i=j; or
send second index indication information and third index indication information, where the second index indication information indicates an orthogonal sequence whose length is Li, and the third index indication information indicates an orthogonal sequence whose length is Lj, i=1, 2, 3, 4, 5 or 6, j=1, 2, 3, 4, 5 or 6, and i≠j.

In an implementation, the transceiver module is further configured to:
receive first capability information from a terminal device, where the first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

In an implementation, the processing module is configured to:

generate the first indication information based on the first capability information.

For technical effects brought by the third aspect, the fourth aspect, the implementations of the third aspect, or the implementations of the fourth aspect, refer to the descriptions of the technical effects of the first aspect, the second aspect, the implementations of the first aspect, or the implementations of the second aspect.

According to a fifth aspect, an embodiment of this application provides a communication apparatus. The communication apparatus may be the communication apparatus in the third aspect or the fourth aspect in the foregoing embodiments, or a chip or a chip system disposed in the communication apparatus in the third aspect or the fourth aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus is enabled to perform the method performed by the terminal device or the network device in the foregoing method embodiments.

In an implementation, the processor is configured to determine a first transmission manner from a plurality of transmission manners, and the communication interface is configured to send a PUCCH in the first transmission manner. The plurality of transmission manners include a first non-frequency hopping transmission manner or an inter-time unit frequency hopping transmission manner. Alternatively, the plurality of transmission manners include a second non-frequency hopping transmission manner and an intra-time unit frequency hopping transmission manner, and the plurality of transmission manners do not include the first non-frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an optional implementation, the processor is configured to:

determine the first transmission manner from the plurality of transmission manners based on first indication information and/or a pre-specified rule, where the first indication information indicates the first transmission manner.

In an optional implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an optional implementation, the first indication information indicates at least one of the following:

the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and the processor is further configured to obtain, based on the first indication information, a rule used for determining an RB location of the PUCCH, where the first indication information indicates the used rule from a plurality of rules.

For example, the plurality of rules include at least two rules of a first rule, a second rule, and a third rule.

The first rule is: $0 \le r_{PUCCH} \le (X/2)-1$, and an RB index value of the PUCCH is equal to $RB_{BWP}^{offset} + \lfloor r_{PUCCH}/N_{CS} \rfloor$; and/or $X/2 \le r_{PUCCH} \le X-1$, and the RB index value of the PUCCH is equal to $N_{BWP}^{size}-1-RB_{BWP}^{offset}-\lfloor (r_{PUCCH}-8)/N_{CS} \rfloor$.

The second rule is: $0 \le r_{PUCCH} \le X-1$, and an RB index value of the PUCCH is equal to $RB_{BWP}^{offset} + \lfloor r_{PUCCH}/N_{CS} \rfloor$.

The third rule is: $0 \le r_{PUCCH} \le X-1$, and an RB index value of the PUCCH is equal to $N_{BWP}^{size}-1-RB_{BWP}^{offset}-\lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, and $N_{BWP}^{Size}$ is a size of a bandwidth part BWP on which the PUCCH resource is configured.

In an optional implementation, the processor is further configured to:

determine indexes of orthogonal sequences whose lengths are Li and Lj, where i=1, 2, 3, 4, 5, or 6, and j=1, 2, 3, 4, 5 or 6; and if i=j, determine the index of the orthogonal sequence whose length is Li and the index of the orthogonal sequence whose length is Lj based on first index indication information; or if i≠j, determine the index of the orthogonal sequence whose length is Li based on second index indication information, and determine the index of the orthogonal sequence whose length is Lj based on third index indication information.

In an optional implementation, the communication interface is further configured to:

send first capability information to a network device, where the first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

In another implementation, the processor is configured to generate first indication information, and the communication interface is configured to send the first indication information. The first indication information indicates a first transmission manner from a plurality of transmission manners, and the plurality of transmission manners include a first non-frequency hopping transmission manner, or the plurality of transmission manners include an inter-time unit frequency hopping transmission manner. Alternatively, the plurality of transmission manners include a second non-frequency hopping transmission manner and an intra-time unit frequency hopping transmission manner, and the plurality of transmission manners do not include the first non-frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an optional implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission manner; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an optional implementation, the first indication information indicates at least one of the following:

the first non-frequency hopping transmission manner, the second non-frequency hopping transmission manner, the intra-time unit frequency hopping transmission manner, and the inter-time unit frequency hopping transmission manner.

In an optional implementation, the first transmission manner is the second non-frequency hopping transmission manner, and the first indication information further indicates, from a plurality of rules, a rule used for determining a resource block RB location of the PUCCH.

In an optional implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and/or $X/2 \leq r_{PUCCH} \leq X-1$ and the RB index value of the PUCCH is equal to $N_{BWP}^{size} - 1 - RB_{BWP}^{offset} - \lfloor (r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size} - 1 - RB_{BWP}^{offset} - \lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured, and X is an integer.

In an optional implementation, the communication interface is further configured to:

send first index indication information, where the first index indication information indicates an orthogonal sequence whose length is Li and an orthogonal sequence whose length is Lj, i=1, 2, 3, 4, 5 or 6, j=1, 2, 3, 4, 5 or 6, and i=j; or send second index indication information and third index indication information, where the second index indication information indicates an orthogonal sequence whose length is Li, and the third index indication information indicates an orthogonal sequence whose length is Lj, i=1, 2, 3, 4, 5 or 6, j=1, 2, 3, 4, 5 or 6, and i≠j.

In an optional implementation, the communication interface is further configured to receive first capability information from a terminal device. The first capability information indicates at least one of the following: whether the first non-frequency hopping transmission manner is supported, whether the inter-time unit frequency hopping transmission manner is supported, whether the terminal device determines the RB index of the PUCCH according to the second rule, and whether the terminal device determines the RB index of the PUCCH according to the third rule.

In an implementation, the processor is configured to: generate the first indication information based on the first capability information.

It should be understood that the communication interface may be a transceiver in the communication apparatus, for example, implemented by using an antenna, a feeder, and a codec in the communication apparatus. Alternatively, if the communication apparatus is a chip disposed in a network device, the communication interface may be an input/output interface of the chip, for example, an input/output circuit or a pin, and is configured to input/output an instruction, data, or a signal. The transceiver is used by the communication apparatus to communicate with another device. For example, when the communication apparatus is a terminal device, the another device is a network device. Alternatively, when the communication apparatus is a network device, the another device is a terminal device.

According to a sixth aspect, an embodiment of this application provides a chip system. The chip system includes a processor, may further include a memory and/or a communication interface, and is configured to implement the method in the first aspect or the second aspect. In an implementation, the chip system further includes the memory, configured to store program instructions and/or data. The chip system may include a chip, or may include a chip and another discrete device.

According to a seventh aspect, an embodiment of this application provides a communication system. The communication system includes the communication apparatus according to the third aspect and the communication apparatus according to the fourth aspect; or the communication system includes the communication apparatus according to the third aspect and the communication apparatus in the another implementation of the fifth aspect; or the communication system includes the communication apparatus according to the fourth aspect and the communication apparatus in the implementation of the fifth aspect; or the communication system includes communication apparatuses respectively corresponding to the two implementations of the fifth aspect.

According to an eighth aspect, this application provides a computer-readable storage medium. The computer-readable storage medium stores a computer program; and when the computer program is run, the method in the first aspect or the second aspect is implemented.

According to a ninth aspect, a computer program product is provided. The computer program product includes computer program code, and when the computer program code is run, the method in the first aspect or the second aspect is performed.

For beneficial effects of the fifth aspect to the ninth aspect and the implementations of the fifth aspect to the ninth aspect, refer to descriptions of beneficial effects of the aspects or the implementations of the aspects.

DESCRIPTION OF EMBODIMENTS

To make objectives, technical solution, and advantages of embodiments of this application clearer, the following further describes embodiments of this application in detail with reference to the accompanying drawings.

The technical solutions provided in embodiments of this application may be applied to a fifth generation (5G) mobile communication system, for example, an NR system, or may be applied to a long term evolution (LTE) system, or may be applied to a next generation mobile communication system or another similar communication system. This is not limited.

Figure 1:
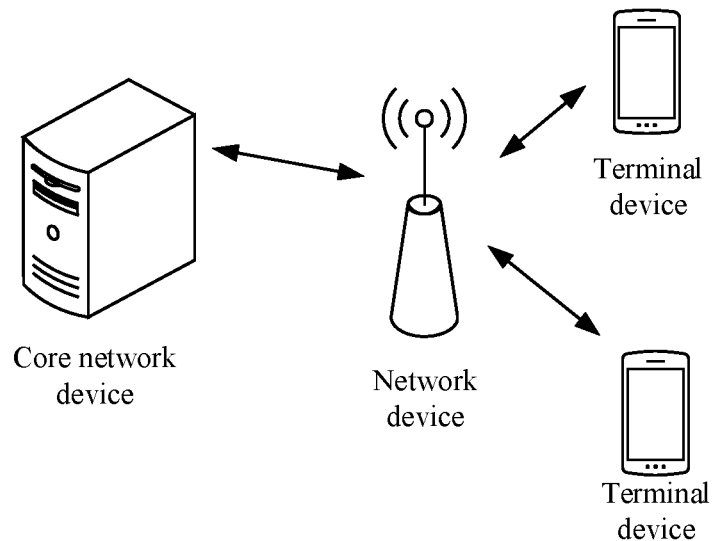
FIG. 1 is a diagram of a network architecture to which an embodiment of this application is applicable.

Refer to FIG. 1. FIG. 1 is an example diagram depicting an architecture of a communication system to which an embodiment of this application is applicable. The communication system may include a core network device, a network device, and at least one terminal. In FIG. 1, two terminals are used as an example. The terminal devices are connected to the network device in a wireless manner, and the network device is connected to the core network device in a wireless manner or a wired manner. The core network device and the network device may be different physical devices that are independent of each other; or functions of the core network device and logical functions of the network device are integrated into a same physical device; or some functions of the core network device and some functions of the network device are integrated into a same physical device. It should be noted that FIG. 1 is merely an example. Quantities of core network devices, network devices, and terminals included in the mobile communication system are not limited in embodiments of this application. In some embodiments, the communication system may further include another network device, for example, a wireless relay device or a wireless backhaul device.

The network device is an access device through which a terminal accesses the mobile communication system in a wireless manner. For example, the network device includes an access network (AN) device, or a base station (for example, an access point). The network device may also be a device that communicates with a terminal over an air interface. The network device is another terminal apparatus in an example, or a roadside unit (RSU) in a V2X technology in another example. The base station may be configured to mutually convert a received over-the-air frame and an internet protocol (IP) packet and serve as a router between the terminal and a rest portion of the access network, where the rest portion of the access network may include an IP network. The RSU may be a fixed infrastructure entity supporting a V2X application, and may exchange a message with another entity supporting the V2X application. The network device may further coordinate attribute management of the air interface. For example, the network device may include an evolved base station (NodeB, eNB, or e-NodeB, evolutional Node B) in a long term evolution (LTE) system or a long term evolution advanced (LTE-A) system; or may include a next generation node B (gNB) in a 5G NR system; or may include a centralized unit (CU) and a distributed unit (DU) in a cloud access network (Cloud RAN) system; or may include an access node in a wireless fidelity (Wi-Fi) system. A technology and a device form that are used by the wireless network device are not limited in embodiments of this application.

The terminal device in embodiments of this application may be user equipment (UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone, a tablet computer (Pad), a computer with a wireless transceiver function, a virtual reality (VR) terminal, an augmented reality (AR) terminal, a wireless terminal in industrial control, a wireless terminal in self driving, or the like. The network device may be a next generation base station (next Generation node B, gNB) in an NR system, an evolved base station (evolutional node B, eNB) in an LTE system, or the like.

Terminals may be classified into a plurality of types based on service types supported by the terminals. For example, REDCAP UE is a reduced capability or low-capability terminal. This type of terminal may be less complex than another type of terminal in terms of bandwidth, power consumption, and a quantity of antennas, for example, a narrower bandwidth, lower power consumption, and a smaller quantity of antennas. This type of terminal may also be referred to as an NR light (NRL) terminal, that is, a lite terminal. Relatively, a non-reduced capability or non-low-capability terminal device (for example, an eMBB terminal device) may be referred to as a normal terminal device or a legacy terminal device in embodiments of this application. Alternatively, it may be considered that there are two types of terminal devices in embodiments of this application. For example, a first-type terminal device is a reduced capability terminal device. A second-type terminal device may be a terminal device other than a reduced capability terminal device.

The terminal device in embodiments of this application may be a first-type terminal device, a second-type terminal device, or another terminal device that needs transmission performance enhancement, for example, an NR enhanced mobile broadband (eMBB) terminal device. A difference between the first-type terminal device and the second-type terminal device includes at least one of the following:

1. Bandwidth capabilities are different. A maximum bandwidth supported by the first-type terminal device may be greater than a maximum bandwidth supported by the second-type terminal device. For example, the first-type terminal device may support a maximum of 100 MHz frequency domain resources on one carrier to communicate with the network device, and the second-type terminal device may support a maximum of 20 MHz, 10 MHz, or 5 MHz frequency domain resources on one carrier to communicate with the network device.
2. Quantities of transceiver antennas are different. An antenna configuration of the first-type terminal device may be greater than an antenna configuration of the second-type terminal device. For example, a minimum antenna configuration supported by the first-type terminal device may be greater than a maximum antenna configuration supported by the second-type terminal device.
3. Maximum uplink transmit power is different. Maximum uplink transmit power of the first-type terminal device may be greater than maximum uplink transmit power of the second-type terminal device.
4. The first-type terminal device and the second-type terminal device correspond to different protocol versions. For example, NR Rel-15 and NR Rel-16 terminal devices may be considered as first-type terminal devices, and the second-type terminal device may be considered as an NR Rel-17 terminal device.
5. The first-type terminal device and the second-type terminal device support different carrier aggregation (CA) capabilities. For example, the first-type terminal device may support carrier aggregation, but the second-type terminal device does not support carrier aggregation. For another example, both the second-type terminal device and the first-type terminal device support carrier aggregation, but a maximum quantity of carriers that can be simultaneously aggregated by the first-type terminal device is greater than a maximum quantity of carriers that can be simultaneously aggregated by the second-type terminal device.
6. Frequency division duplex (FDD) capabilities of the first-type terminal device and the second-type terminal device are different. For example, the first-type terminal device may support full-duplex FDD, and the second-type terminal device may support only half-duplex FDD.
7. The second-type terminal device and the first-type terminal device have different data processing time capabilities. For example, a minimum delay between receiving downlink data and sending feedback on the downlink data by the first-type terminal device is less than a minimum delay between receiving the downlink data and sending feedback on the downlink data by the second-type terminal device.
8. The first-type terminal device and the second-type terminal device correspond to different uplink and/or downlink peak transmission rates.

The following describes technical terms in embodiments of this application.
(1) Frequency retuning: When a network device communicates with a terminal device, radio frequency components in the network device and the terminal device operate within specific frequency ranges. A center frequency at which the radio frequency device operates may determine frequency resource locations at which the network device and the terminal device work. If the frequency range within which the radio frequency device operates changes, for example, a frequency domain location and/or a bandwidth change, the radio frequency device needs to perform frequency retuning, to change the center frequency, to change frequency resource location for sending/receiving. Frequency retuning needs to occupy tuning duration, and the network device and the terminal device cannot receive or send information within the tuning duration.

(2) Time unit: A time unit may be a slot or a subframe, or the time unit includes one or more symbols. In embodiments of this application, an example in which the time unit is a slot is used. A part of a slot may be a symbol used for uplink transmission in the slot, for example, a symbol starting from an uplink/downlink switch point to a slot boundary, or a symbol starting from an uplink/downlink switch point to a next uplink/downlink switch point and used for uplink transmission. For downlink transmission, a part of a slot may be a symbol starting from a slot boundary to an uplink/downlink switch point and used for downlink transmission, a symbol starting from an uplink/downlink switch point to a slot boundary and used for downlink transmission, or a symbol starting from an uplink/downlink switch point to a next uplink/downlink switch point and used for downlink transmission. In this application, unless otherwise specified, a symbol is a time domain symbol. The time domain symbol herein may be an orthogonal frequency division multiplexing (OFDM) symbol, or may be a discrete Fourier transform-spread-OFDM (DFT-s-OFDM) symbol.

Figure 2:
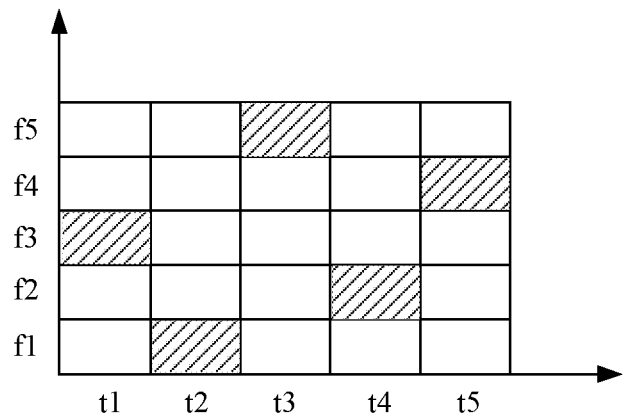
FIG. 2 is a diagram of a frequency hopping signal.

(3) Frequency hopping: Frequency hopping is a communication manner in which a frequency domain resource used in an information transmission process is transformed according to a rule, to obtain a frequency diversity gain. FIG. 2 is a diagram of a frequency hopping signal. As shown in FIG. 2, five time periods t1 to t5 are included in time domain, and five frequency domain resources f1 to f5 are included in frequency domain. The five time periods t1 to t5 correspond to the frequency domain resources f3, f1, f5, f2, and f4 respectively.

In an NR system, inter-slot frequency hopping in a case of PUCCH repetition is supported, and intra-slot frequency hopping in a case of PUCCH non-repetition is supported. Whether intra-slot frequency hopping or inter-slot frequency hopping is used is indicated by using radio resource control (RRC) signaling, and then scheduling signaling (for example, DCI) is used to indicate whether frequency hopping is used in data transmission. In addition, the scheduling signaling further indicates a time-frequency resource for data transmission.

Figure 3:
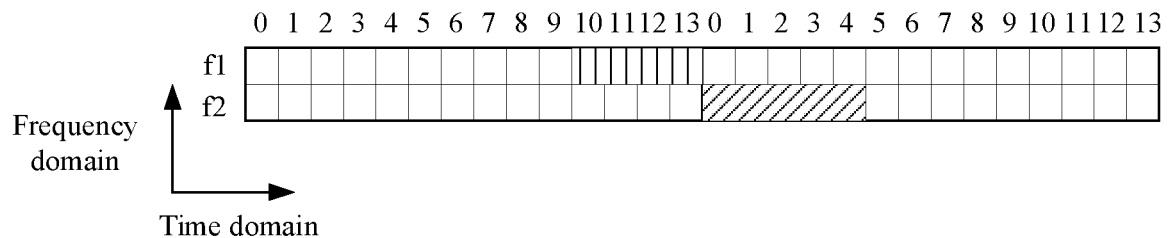
FIG. 3 is a diagram of inter-slot frequency hopping.

Inter-slot frequency hopping means that a frequency domain resource used for information transmission remains unchanged in a slot, but the frequency domain resource used for information transmission changes between different slots according to a predetermined rule. FIG. 3 is a diagram of inter-slot frequency hopping when a PUCCH is repeatedly sent twice. As shown in FIG. 3, two slots are included in time domain, each slot has 14 symbols, and two frequency domain resources f1 and f2 are included in frequency domain. A transmit end sends data in the first slot by using the frequency domain resource f1, and sends data in the second slot by using the frequency domain resource f2. It should be noted that, when an OFDM symbol uses a normal cyclic prefix (NCP), one slot may include 14 symbols. When an OFDM symbol uses an extended cyclic prefix (ECP), one slot may include 12 symbols. In embodiments of this application, an example in which one slot includes 14 symbols is used.

Figure 4:
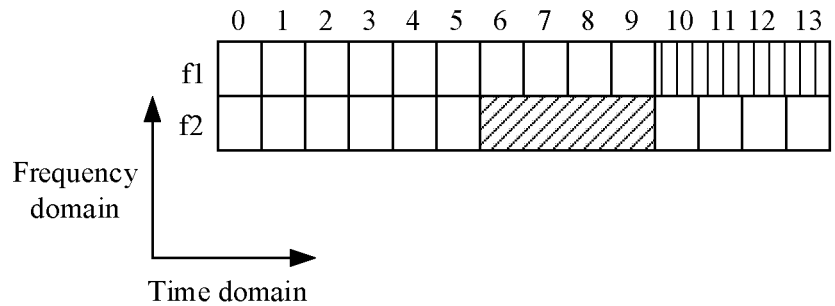
FIG. 4 is a diagram of intra-slot frequency hopping.

Intra-slot frequency hopping means that a frequency domain resource used for information transmission changes in a slot according to a predetermined rule. For example, two-hop frequency hopping is performed in a slot. Information that needs to be transmitted is divided into two parts, and the two parts are transmitted by using different frequency domain resources in the slot. FIG. 4 is a diagram of intra-slot frequency hopping. As shown in FIG. 4, one slot is included in time domain, and two frequency domain resources f1 and f2 are included in frequency domain. Information sent by a transmit end includes two parts: a first part information and a second part information. The transmit end sends the first part information on a symbol 6 to a symbol 9 by using the frequency domain resource f2, and sends the second part information on a symbol 10 to a symbol 13 by using the frequency domain resource f1. Shadow areas in FIG. 3 and FIG. 4 indicate resources occupied for information transmission. In embodiments of this application, information transmission may be signaling transmission, data transmission, or reference signal transmission.

(4) Carrier bandwidth part: A carrier bandwidth part may be a segment of contiguous resources in frequency domain, and the carrier bandwidth part may also be referred to as a bandwidth part (BWP or BP), a subband, a subband bandwidth, a narrowband, or a narrowband bandwidth, or may have another name. The name of the carrier bandwidth part is not limited in embodiments of this application. For brevity, in this specification, an example in which the name is a BWP is used.

The carrier bandwidth part described in this specification may be a downlink carrier bandwidth part, and is used by the terminal device for downlink reception. In this case, a bandwidth of the carrier bandwidth part may exceed a receive bandwidth capability of the terminal device. Alternatively, the carrier bandwidth part may be an uplink carrier bandwidth part, and is used by the terminal device for uplink sending. In this case, a bandwidth of the carrier bandwidth part may exceed a transmit bandwidth capability of the terminal device. In embodiments of this application, the bandwidth capability of the terminal device may be a channel bandwidth supported by the terminal device, a maximum channel bandwidth supported by the terminal device, a quantity of resource blocks (RB) supported by the terminal device, or a maximum quantity of resource blocks supported by the terminal device.

The foregoing describes a network architecture to which embodiments of this application are applicable and related terms. The following describes technical features related to the technical solutions provided in embodiments of this application.

A PUCCH is mainly used to carry UCI and a DMRS. For example, it is assumed that a PUCCH length is L symbols. L5 symbols of the L symbols are used to transmit the UCI on the PUCCH, and L6 symbols of the L symbols are used to transmit the DMRS on the PUCCH. It should be understood that L5+L6=L, and L5, L6, and L are all positive integers. UCI on the PUCCH may be transmitted with intra-slot frequency hopping or without intra-slot frequency hopping. When the UCI on the PUCCH is transmitted with intra-slot frequency hopping, the UCI transmission on the L5 symbols is divided into two hops. When the PUCCH is transmitted without intra-slot frequency hopping, the UCI is transmitted on the L5 symbols without frequency hopping. Similarly, the DMRS on the PUCCH may also be transmitted with intra-slot frequency hopping or without intra-slot frequency hopping. When the DMRS on the PUCCH is transmitted with intra-slot frequency hopping, the DMRS transmission on the L6 symbols is divided into two hops. When the DMRS on the PUCCH is transmitted without intra-slot frequency hopping, the DMRS is transmitted on the L6 symbols without frequency hopping.

Current PUCCH transmission without intra-slot frequency hopping means that the UCI on the PUCCH is sent without frequency hopping by using the L5 symbols in the slot, and the DMRS on the PUCCH is sent without frequency hopping by using the L6 symbols in the slot. It should be understood that, to improve resource utilization, the PUCCH may be sent in a manner of orthogonal sequence block spreading, that is, a PUCCH channel is shared on a same resource (for example, a resource block), to support PUCCH sending of more terminal devices. Therefore, when the PUCCH is transmitted without intra-slot frequency hopping, the L5 symbols are sent by using an orthogonal sequence whose length is L5, and the L6 symbols are sent by using an orthogonal sequence whose length is L6. L5 and L6 may be the same or different. When L5=L6, an index of the orthogonal sequence whose length is L5 may be the same as or different from an index of the orthogonal sequence whose length is L6.

It should be noted that this embodiment of this application further provides a new manner of PUCCH transmission without intra-slot frequency hopping. For differentiation, the new manner of PUCCH transmission without intra-slot frequency hopping provided in this embodiment of this application is referred to as a first non-frequency hopping transmission manner below, and the current manner of PUCCH transmission without intra-slot frequency hopping is referred to as a second non-frequency hopping transmission manner below.

PUCCH transmission with intra-slot frequency hopping means that UCI transmission of the PUCCH on the L5 symbols in the slot is divided into two hops, and DMRS transmission of the PUCCH on the L6 symbols in the slot is divided into two hops. For example, L51 symbols in the L5 symbols are used for first-hop transmission, and L52 symbols in the L5 symbols are used for second-hop transmission. A resource block used by the UCI in the first hop is different from a resource block used by the UCI in the second hop. Similarly, L61 symbols in the L6 symbols are used for first-hop transmission, and L62 symbols in the L6 symbols are used for second-hop transmission. A resource block used by the DMRS in the first hop is different from a resource block used by the DMRS in the second hop.

Figure 5:
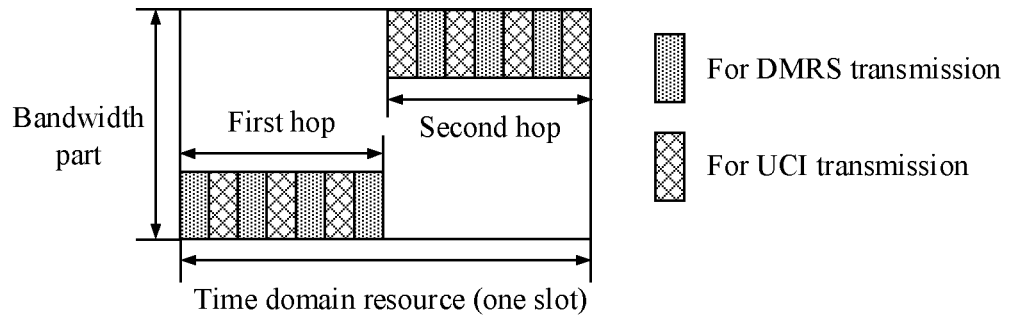
FIG. 5 is a diagram of PUCCH transmission with intra-slot frequency hopping.

Refer to FIG. 5 for an example. FIG. 5 is a diagram of PUCCH transmission with intra-slot frequency hopping. In FIG. 5, an example of intra-slot frequency hopping with two hops for an eMBB terminal device is used. In FIG. 5, an example in which a time domain resource is one slot, namely, 14 symbols, is used. Each shadow part in FIG. 5 corresponds to one symbol. As shown in FIG. 5, UCI and a DMRS on the PUCCH in one slot are separately divided into two parts. A first part uses a first frequency domain resource in the slot, and a second part uses a second frequency domain resource in the slot.

For ease of understanding, refer to Table 1. Table 1 is a table of a PUCCH length and UCI transmission of the PUCCH. The PUCCH length may be 4 to 14 symbols, as shown in the first column of Table 1. If the UCI on the PUCCH is transmitted without frequency hopping, L5 symbols are used to transmit the UCI. If the UCI on the PUCCH is transmitted with intra-slot frequency hopping, UCI transmission on the L5 symbols is divided into two hops. In Table 1, a numeric quantity (L51) of symbols shown in the third column is used for the first hop, and a numeric quantity (L52) of symbols shown in the fourth column is used for the second hop. L5=L51+L52.

TABLE 1

PUCCH length and a quantity of symbols corresponding to UCI carried on the PUCCH

| PUCCH length | Quantity L5 of symbols for the UCI without intra-slot frequency hopping | Quantity L51 of symbols for the first hop if the UCI is transmitted with intra-slot frequency hopping | Quantity L52 of symbols for the second hop if the UCI is transmitted with intra-slot frequency hopping |
| --- | --- | --- | --- |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

Refer to Table 2. Table 2 is a table of a PUCCH length and DMRS transmission of the PUCCH. The PUCCH length may be 4 to 14 symbols, as shown in the first column of Table 2. If the DMRS on the PUCCH is transmitted without frequency hopping, L6 symbols are used to transmit the DMRS. If the DMRS on the PUCCH is transmitted with intra-slot frequency hopping, DMRS transmission on the L6 symbols is divided into two hops. For example, in Table 2, L61 (the numeric quantity shown in the third column) symbols are used for the first hop, and L62 (the numeric quantity shown in the fourth column) symbols are used for the second hop. L6=L61+L62.

TABLE 2

PUCCH length and a quantity of symbols corresponding to a DMRS carried on the PUCCH

| PUCCH length | Quantity L6 of symbols for the DMRS without intra-slot frequency hopping | Quantity L61 of symbols for the first hop if the DMRS is transmitted with intra-slot frequency hopping | Quantity L62 of symbols for the second hop if the DMRS is transmitted with intra-slot frequency hopping |
| --- | --- | --- | --- |
| 4 | 2 | 1 | 1 |
| 5 | 3 | 1 | 2 |
| 6 | 3 | 2 | 1 |
| 7 | 4 | 2 | 2 |
| 8 | 4 | 2 | 2 |
| 9 | 5 | 2 | 3 |
| 10 | 5 | 3 | 2 |
| 11 | 6 | 3 | 3 |
| 12 | 6 | 3 | 3 |

TABLE 2-continued

PUCCH length and a quantity of symbols corresponding
to a DMRS carried on the PUCCH

| PUCCH length | Quantity L6 of symbols for the DMRS without intra-slot frequency hopping | Quantity L61 of symbols for the first hop if the DMRS is transmitted with intra-slot frequency hopping | Quantity L62 of symbols for the second hop if the DMRS is transmitted with intra-slot frequency hopping |
|---|---|---|---|
| 13 | 7 | 3 | 4 |
| 14 | 7 | 4 | 3 |

Figure 6:
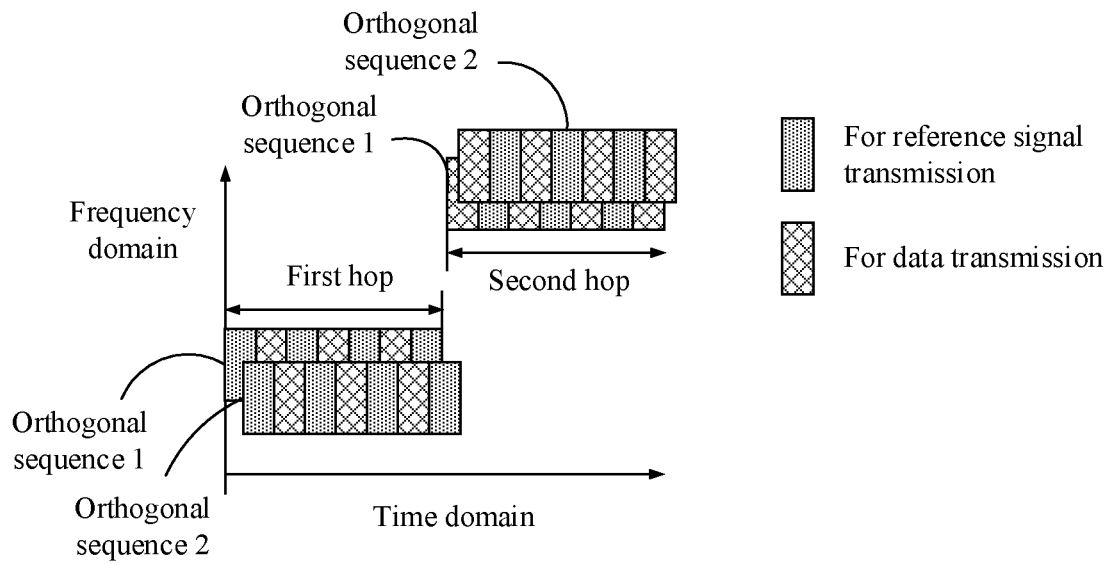
FIG. 6 is a diagram of PUCCH transmission with intra-slot frequency hopping by two terminal devices.

To improve resource utilization, the PUCCH may be sent in a manner of orthogonal sequence block spreading, that is, a PUCCH channel is shared on a same resource (for example, a resource block), to support PUCCH sending of more terminal devices. For ease of understanding, refer to FIG. 6. FIG. 6 is a diagram of sending PUCCHs by two terminal devices in a manner of orthogonal sequence block spreading. In FIG. 6, each shadow part corresponds to one symbol.

It is assumed that a cyclic prefix of a symbol included in a slot shown in FIG. 6 is a normal cyclic prefix, and one slot includes 14 symbols. Both a PUCCH of a terminal device 1 and a PUCCH of a terminal device 2 occupy 14 symbols, and the terminal device 1 and the terminal device 2 share a same resource block. In this case, an orthogonal sequence 1 may be used for PUCCH transmission of the terminal device 1, and an orthogonal sequence 2 may be used for PUCCH transmission of the terminal device 2. The PUCCHs of the terminal device 1 and the terminal device 2 are sent with frequency hopping in the slot. For example, seven symbols in the slot are used to send UCI on the PUCCH, and the other seven symbols in the slot are used to send a DMRS on the PUCCH.

It should be understood that, for PUCCH transmission with intra-slot frequency hopping, to improve resource utilization, the PUCCH may also be sent in the manner of orthogonal sequence block spreading. That is, a first hop and a second hop of the UCI carried on the PUCCH may also be sent in the manner of orthogonal sequence block spreading. For example, the first hop of the UCI is sent by using an orthogonal sequence whose length is L51, and the second hop of the UCI is sent by using an orthogonal sequence whose length is L52. For values of L51 and L52, refer to Table 1. Similarly, for the DMRS, a first hop and a second hop of the DMRS carried on the PUCCH may also be sent in the manner of orthogonal sequence block spreading. For example, the first hop of the DMRS is sent by using an orthogonal sequence whose length is L61, and the second hop of the DMRS is sent by using an orthogonal sequence whose length is L62. For values of L61 and L62, refer to Table 2.

In addition, a resource block used by the UCI in the first hop is different from a resource block used by the UCI in the second hop. The length of the orthogonal sequence used by the UCI in the first hop may be the same as or different from the length of the orthogonal sequence used by the UCI in the second hop. That is, an index of the orthogonal sequence used by the UCI in the first hop is the same as or different from an index of the orthogonal sequence used by the UCI in the second hop. Similarly, a resource block used by the DMRS in the first hop is different from a resource block used by the DMRS in the second hop. The length of the orthogonal sequence used by the DMRS in the first hop may be the same as or different from the length of the orthogonal sequence used by the DMRS in the second hop. That is, an index of the orthogonal sequence used by the DMRS in the first hop is the same as or different from an index of the orthogonal sequence used by the UCI in the second hop.

The resource block used by the UCI in the first hop may be the same as the resource block used by the DMRS in the first hop, and the resource block used by the UCI in the second hop may be the same as the resource block used by the DMRS in the second hop. The length of the orthogonal sequence used by UCI in the first hop may be the same as the length of the orthogonal sequence used by the DMRS in the first hop. For example, the index of the orthogonal sequence used by the UCI in the first hop is the same as or different from the index of the orthogonal sequence used by the DMRS in the first hop. The length of the orthogonal sequence used by UCI in the second hop may be the same as the length of the orthogonal sequence used by the DMRS in the second hop. For example, the index of the orthogonal sequence used by the UCI in the second hop is the same as or different from the index of the orthogonal sequence used by the DMRS in the second hop.

Figure 7:
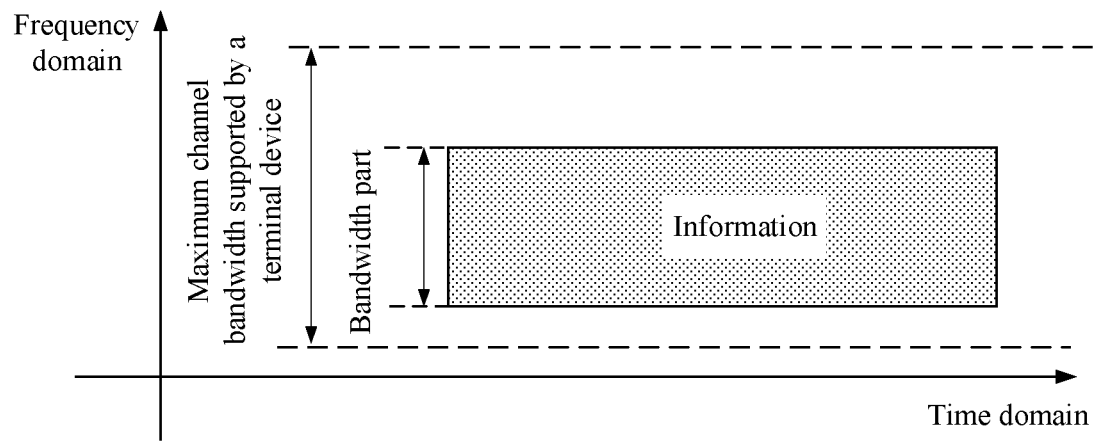
FIG. 7 is a diagram of sending a PUCCH by a terminal device within a frequency range that does not exceed a maximum channel bandwidth capability of the terminal device.
Figure 8:
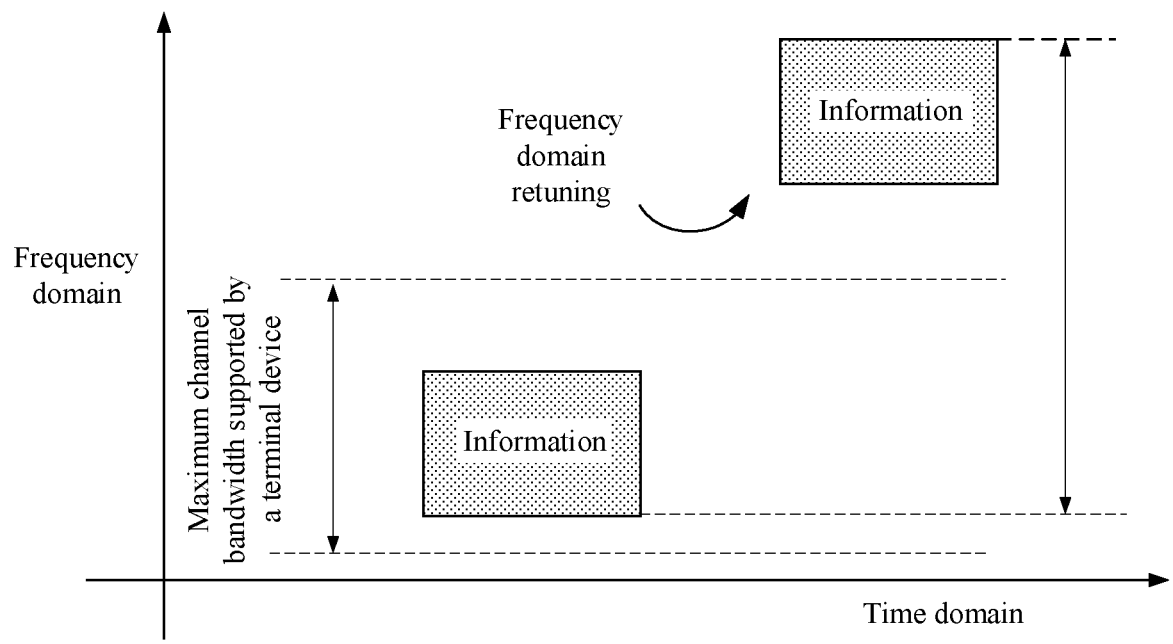
FIG. 8 is a diagram of sending a PUCCH by a terminal device within a frequency range that exceeds a maximum channel bandwidth capability of the terminal device.

The terminal device may transmit the PUCCH by using either of the foregoing two PUCCH transmission manners. Usually, a terminal device receives or sends a PUCCH within a frequency range that does not exceed a maximum channel bandwidth capability of the terminal device. In this case, as shown in FIG. 7, the terminal device does not need to perform frequency retuning. In FIG. 7, a frequency domain resource occupied for PUCCH sending or receiving is a shadow part in FIG. 7. The terminal device may need to receive or send a PUCCH within a larger frequency range. However, for a reduced capability terminal device, a bandwidth capability of the reduced capability terminal device is limited. If the reduced capability terminal device receives or sends information within a frequency range that exceeds a maximum channel bandwidth capability of the terminal device, the reduced capability terminal device needs to perform frequency retuning, to receive or send information within a larger frequency range. As shown in FIG. 8, when a reduced capability terminal device sends a PUCCH within a frequency range that exceeds a maximum channel bandwidth capability of the reduced capability terminal device, the reduced capability terminal device needs duration of M symbols for frequency retuning. Because the M symbols are used for frequency retuning, the PUCCH cannot be transmitted in tuning duration of M symbols, causing degraded PUCCH transmission performance of the reduced capability terminal device.

That the reduced capability terminal device performs frequency retuning in the duration of M symbols may also be understood as that the M symbols are punctured and cannot be used to transmit the PUCCH, but a normal terminal device can transmit the PUCCH using the M symbols. Therefore, interference caused by the reduced capability terminal device to the normal terminal device cannot be avoided. For example, there are originally L symbols for transmitting UCI or a DMRS on a PUCCH of the reduced capability terminal device or the normal terminal device. For the reduced capability terminal device, M symbols in the L symbols are used for frequency retuning, that is, the M symbols are punctured. In this case, a length of an orthogonal sequence used by the reduced capability terminal device to transmit the UCI or DMRS on the PUCCH changes from L to L-M. However, for the normal terminal device, a length of an orthogonal sequence used to transmit the UCI or DMRS on the PUCCH is still L. It is clear that orthogonality between PUCCH transmission of the reduced capability terminal device and PUCCH transmission of the normal terminal device cannot be ensured, and interference is caused to PUCCH transmission of the normal terminal device, causing degraded PUCCH transmission performance of the normal terminal device.

In view of this, this embodiment of this application provides two new PUCCH transmission manners. Even if a reduced capability terminal device receives or sends a PUCCH within a frequency range that exceeds a maximum channel bandwidth capability of the reduced capability terminal device, interference caused by the reduced capability terminal device to PUCCH sending or receiving of a normal terminal device can be reduced, and degraded PUCCH transmission performance of the normal terminal device can be avoided as far as possible. In this way, degraded PUCCH transmission performance of the reduced capability terminal device can be avoided.

A first new PUCCH transmission manner provided in this embodiment of this application is an inter-time unit frequency hopping manner. A first hop of a PUCCH is sent by using F symbols in an $n^{th}$ time unit, and a second hop of the PUCCH is sent by using L-F symbols in an $(n+1)^{th}$ time unit. A PUCCH length is L symbols, and there is an interval of 14-F symbols between a last symbol in the F symbols and a first symbol in the L-F symbols, where F and L are positive integers. It should be understood that when the time unit is a slot, one slot includes 14 symbols. Alternatively, in a case of 15 kHz, a subframe is equivalent to a slot. In this embodiment of this application, there is an interval of a specific quantity of symbols between the first hop and the second hop of the PUCCH. Therefore, for the reduced capability terminal device, even if the PUCCH is received or sent within a frequency range that exceeds a maximum channel bandwidth capability of the reduced capability terminal device, frequency retuning may be performed on the specific quantity of symbols, and PUCCH transmission is not affected. In this way, degraded PUCCH transmission performance of the reduced capability terminal device can be avoided.

In addition, in this embodiment of this application, the interval between the last symbol of the first hop for sending the PUCCH and the first symbol of the second hop for sending the PUCCH is 14 minus the length of the first hop. This can ensure that a start symbol of the first hop is the same as a start symbol of the second hop, so that the PUCCH is sent from a start location closest to the specified PUCCH resource.

Figure 9:
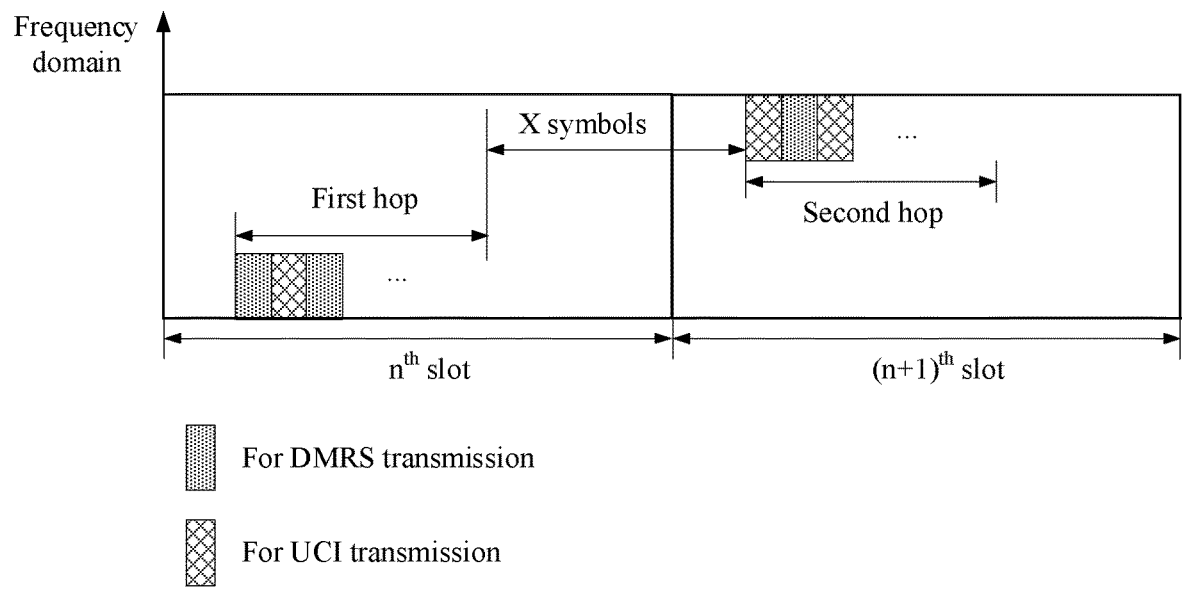
FIG. 9 is a diagram of PUCCH transmission with inter-time unit frequency hopping according to an embodiment of this application.
Figure 10:
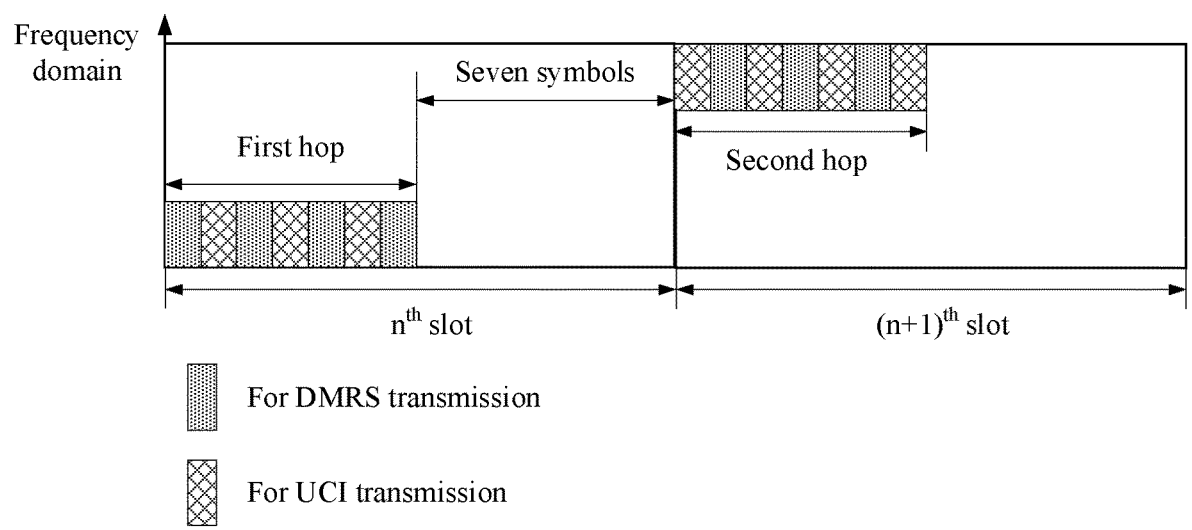
FIG. 10 is another diagram of PUCCH transmission with inter-time unit frequency hopping according to an embodiment of this application.

For ease of understanding, refer to FIG. 9. FIG. 9 is a diagram of PUCCH transmission with inter-time unit frequency hopping according to an embodiment of this application. In FIG. 9, an example in which the time unit is a slot is used. It can be seen from FIG. 9 that a first hop of the PUCCH is transmitted in an $n^{th}$ slot, and a second hop of the PUCCH is transmitted in an $(n+1)^{th}$ slot. There is an interval of X symbols between a last symbol used for the first hop of the PUCCH transmission and a first symbol used for the second hop of the PUCCH transmission, and X is related to a length F of the first hop, for example, X=14-F. That is, the quantity of symbols between the last symbol used for the first hop of the PUCCH transmission and the first symbol used for the second hop of the PUCCH transmission is less than 14. For example, it is assumed that the PUCCH length is L symbols, and F symbols in the $n^{th}$ slot are used for the first hop of the PUCCH transmission. In this case, in the $(n+1)^{th}$ slot, L-F symbols are used for the second hop of the PUCCH transmission, where X=14-floor(L/2). Specially, when L is an even number, X=14-(L/2). For example, when L=14, a diagram of PUCCH transmission with inter-time unit frequency hopping corresponding to FIG. 9 is shown in FIG. 10. It can be learned from FIG. 9 and FIG. 10 that there is an interval of X symbols between the first hop and the second hop of the PUCCH. In this case, when sending or receiving the PUCCH within a frequency range that exceeds a maximum channel bandwidth capability of the reduced capability terminal device, the reduced capability terminal device may perform frequency retuning in the X symbols, and does not occupy a symbol for PUCCH transmission of the reduced capability terminal device. This avoids degraded PUCCH transmission performance of the reduced capability terminal device.

According to the second new PUCCH transmission manner (that is, the first non-frequency hopping transmission manner in this application) provided in this embodiment of this application, the PUCCH is sent without frequency hopping in a time unit, and UCI transmission of the PUCCH in the time unit includes a first part and a second part, where the first part is sent by using an orthogonal sequence whose length is L1, and the second part is sent by using an orthogonal sequence whose length is L2. Similarly, according to the second PUCCH transmission manner provided in this embodiment of this application, the PUCCH may also be sent without frequency hopping in a time unit, and the DMRS on the PUCCH in the time unit includes a third part and a fourth part, where the third part is sent by using an orthogonal sequence whose length is L3, and the fourth part is sent by using an orthogonal sequence whose length is L4. Alternatively, according to the second PUCCH transmission manner provided in this embodiment of this application, the PUCCH is sent without frequency hopping in a time unit, and UCI transmission of the PUCCH in the time unit includes a first part and a second part, where the first part is sent by using an orthogonal sequence whose length is L1, and the second part is sent by using an orthogonal sequence whose length is L2, and the DMRS on the PUCCH in the time unit includes a third part and a fourth part, where the third part is sent by using an orthogonal sequence whose length is L3, and the fourth part is sent by using an orthogonal sequence whose length is L4.

According to the first non-frequency hopping transmission manner provided in this embodiment of this application, the UCI on the PUCCH is essentially divided into two parts, and the two parts are respectively sent by using orthogonal sequences of a same length or different lengths. Similarly, the DMRS on the PUCCH may also be divided into two parts, and the two parts are respectively sent by using orthogonal sequences of a same length or different lengths.

For example, L5 symbols in one slot are used to send the UCI on the PUCCH, and L6 symbols in the slot are used to send the DMRS. The UCI on the L5 symbols is divided into two parts. For example, L1 symbols of the L5 symbols are used to send the first part of the UCI, and L2 symbols of the L5 symbols are used to send the second part of the UCI. The first part is sent by using an orthogonal sequence whose length is L1, and the second part is sent by using an orthogonal sequence whose length is L2, where L1+L2=L5. Similarly, L3 symbols of the L6 symbols are used to send the third part of the DMRS, and L4 symbols of the L6 symbols are used to send the fourth part of the DMRS. The third part is sent by using an orthogonal sequence whose length is L3, and the fourth part is sent by using an orthogonal sequence whose length is L4. It should be understood that L3+L4=L6.

In this embodiment of this application, a relationship between the PUCCH length L and L1 and L2 may be pre-specified. L1 and L2 may be determined based on the relationship and the PUCCH length L. Refer to Table 3 for an example. Table 3 is a table of the relationship between the PUCCH length L and L1 and L2 according to this embodiment of this application.

TABLE 3

| PUCCH length L | L1 | L2 |
|---|---|---|
| 4 | 1 | 1 |
| 5 | 1 | 2 |
| 6 | 2 | 1 |
| 7 | 2 | 2 |
| 8 | 2 | 2 |
| 9 | 2 | 3 |
| 10 | 3 | 2 |
| 11 | 3 | 3 |
| 12 | 3 | 3 |
| 13 | 3 | 4 |
| 14 | 4 | 3 |

The first part of the UCI is sent by using an orthogonal sequence whose length is L1, and the second part of the UCI is sent by using an orthogonal sequence whose length is L2. There are a plurality of orthogonal sequences whose lengths are L1, and there are also a plurality of orthogonal sequences whose lengths are L2. When sending the PUCCH, the terminal device needs to determine, from the plurality of orthogonal sequences whose lengths are L1, the orthogonal sequence for sending the first part of the UCI, and determine, from the plurality of orthogonal sequences whose lengths are L2, the orthogonal sequence for sending the second part of the UCI. It should be understood that for a sequence whose length is Li, the network device indicates, from Li orthogonal sequences, an orthogonal sequence whose length is Li. Correspondingly, the terminal device may determine the orthogonal sequence whose length is Li. Therefore, the terminal device may determine, from L1 orthogonal sequences whose lengths are L1, the orthogonal sequence for sending the first part of the UCI, and determine, from L2 orthogonal sequences whose lengths are L2, the orthogonal sequence for sending the second part of the UCI.

In this embodiment of this application, if lengths of orthogonal sequences are different, indexes of the orthogonal sequences are different. If lengths of orthogonal sequences are the same, indexes of the orthogonal sequences may be the same or may be different. A correspondence between the index of the orthogonal sequence whose length is L1 and the index of the orthogonal sequence whose length is L2 may be specified or negotiated, for example, the indexes are the same or different, so that indexes of orthogonal sequences in all lengths are determined based on the correspondence.

For example, it is pre-specified that the index of the orthogonal sequence whose length is L1 is the same as the index of the orthogonal sequence whose length is L2. In this case, the terminal device needs to determine only the index of the orthogonal sequence whose length is L1, to determine the index of the orthogonal sequence whose length is L2. Alternatively, the terminal device needs to determine only the index of the orthogonal sequence whose length is L2, to determine the index of the orthogonal sequence whose length is L1.

For example, it is pre-specified that the index of the orthogonal sequence whose length is L1 is different from the index of the orthogonal sequence whose length is L2. In this case, the terminal device needs to separately determine the index of the orthogonal sequence whose length is L1 and the index of the orthogonal sequence whose length is L2.

For how the terminal device determines the index of the orthogonal sequence for sending the UCI is described in detail below with reference to related content about determining, by the terminal device, a transmission manner used to send the PUCCH.

The foregoing describes UCI sending in the first non-frequency hopping transmission manner. DMRS sending is similar to UCI sending. That is, a relationship between the PUCCH length L and L3 and L4 may be pre-specified. L3 and L4 may be determined based on the relationship and the PUCCH length L. Refer to Table 4 for an example. Table 4 is a table of the relationship between the PUCCH length L and L3 and L4 according to this embodiment of this application.

TABLE 4

| PUCCH length L | L3 | L4 |
|---|---|---|
| 4 | 1 | 1 |
| 5 | 1 | 2 |
| 6 | 2 | 1 |
| 7 | 2 | 2 |
| 8 | 2 | 2 |
| 9 | 2 | 3 |
| 10 | 3 | 2 |
| 11 | 3 | 3 |
| 12 | 3 | 3 |
| 13 | 3 | 4 |
| 14 | 4 | 3 |

The third part of the DMRS is sent by using an orthogonal sequence whose length is L3, and the fourth part of the DMRS is sent by using an orthogonal sequence whose length is L4. There are a plurality of orthogonal sequences whose lengths are L3, and there are also a plurality of orthogonal sequences whose lengths are L4. When sending the PUCCH, the terminal device needs to determine, from the plurality of orthogonal sequences whose lengths are L3, the orthogonal sequence for sending the third part of the DMRS, and determine, from the plurality of orthogonal sequences whose lengths are L4, the orthogonal sequence for sending the fourth part of the DMRS. It should be understood that for a sequence whose length is Li, the network device indicates, from Li orthogonal sequences, an orthogonal sequence whose length is Li. Correspondingly, the terminal device may determine the orthogonal sequence whose length is Li. Therefore, the terminal device may determine, from L3 orthogonal sequences whose lengths are L3, the orthogonal sequence for sending the third part of the DMRS, and determine, from L4 orthogonal sequences whose lengths are L4, the orthogonal sequence for sending the fourth part of the DMRS.

Similar to the UCI, a correspondence between the index of the orthogonal sequence whose length is L3 and the index of the orthogonal sequence whose length is L4 may be specified or negotiated, for example, the indexes are the same or different, so that indexes of orthogonal sequences in all lengths are determined based on the correspondence.

For example, it is pre-specified that the index of the orthogonal sequence whose length is L3 is the same as the index of the orthogonal sequence whose length is L4. In this case, the terminal device needs to determine only the index of the orthogonal sequence whose length is L3, to determine the index of the orthogonal sequence whose length is L4. Alternatively, the terminal device needs to determine only the index of the orthogonal sequence whose length is L4, to determine the index of the orthogonal sequence whose length is L3.

For example, it is pre-specified that the index of the orthogonal sequence whose length is L3 is different from the index of the orthogonal sequence whose length is L4. In this case, the terminal device needs to separately determine the index of the orthogonal sequence whose length is L3 and the index of the orthogonal sequence whose length is L4.

For how the terminal device determines the index of the orthogonal sequence for sending the DMRS is described in detail below with reference to related content about determining, by the terminal device, a transmission manner used to send the PUCCH.

The reduced capability terminal device uses the first non-frequency hopping transmission manner provided in this embodiment of this application, so that degraded PUCCH transmission performance of the reduced capability terminal device due to frequency retuning can be avoided. In addition, when the reduced capability terminal device and the normal terminal device share a PUCCH resource, the reduced capability terminal device uses the first non-frequency hopping transmission manner provided in this embodiment of this application, so that sequences used when the normal terminal device and the reduced capability terminal device send the PUCCH are still orthogonal. This avoids interference to PUCCH transmission of the normal device, and ensures PUCCH transmission performance of the normal terminal device.

Figure 11:
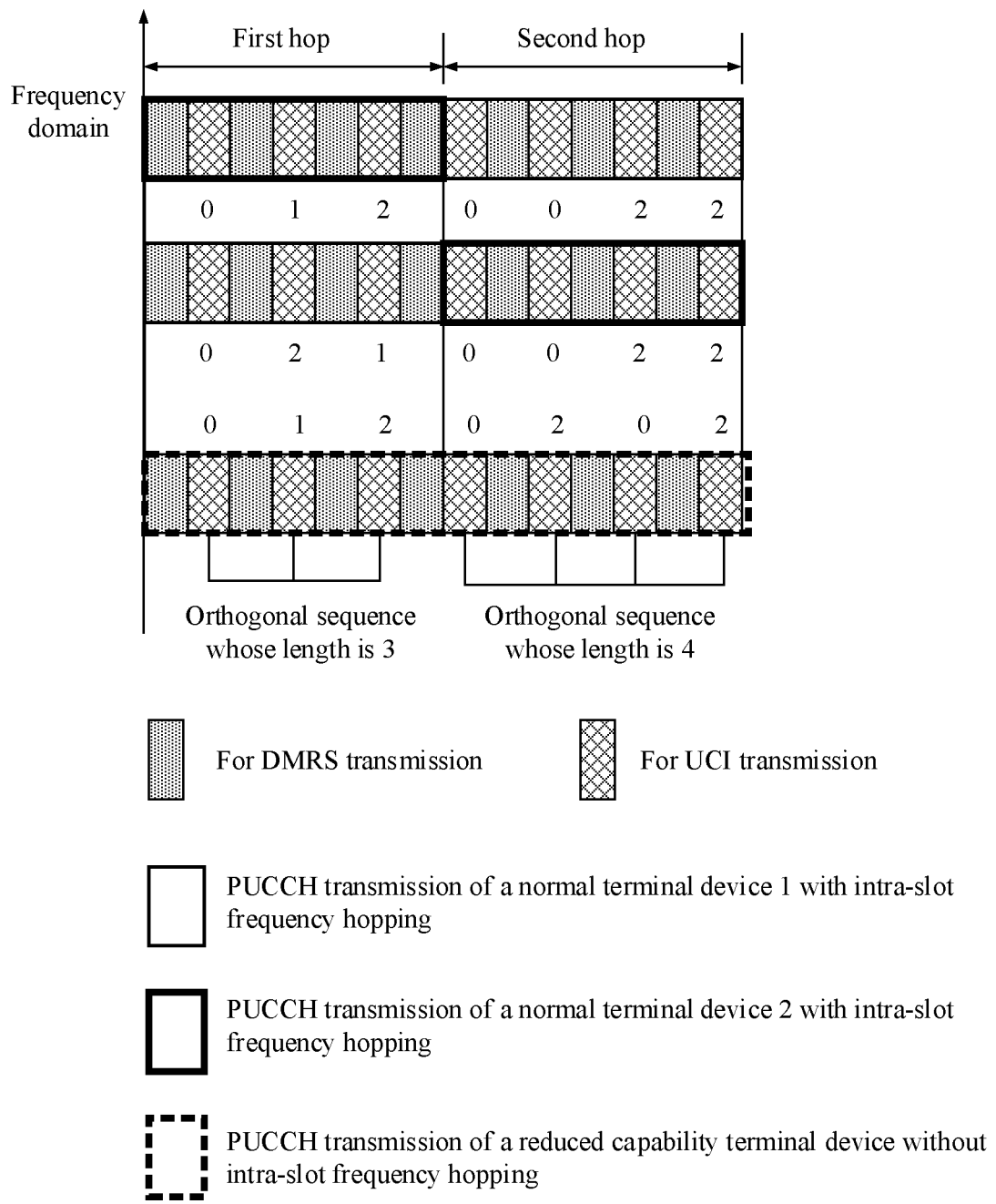
FIG. 11 is a diagram of sharing a PUCCH resource by a reduced capability terminal device and a normal terminal device for PUCCH transmission according to an embodiment of this application.

For ease of understanding, refer to FIG. 11. FIG. 11 shows that a reduced capability terminal device and a normal terminal device share a PUCCH resource to transmit a PUCCH. In FIG. 11, an example in which two normal terminal devices and one reduced capability terminal device transmit UCI of PUCCHs is used. A normal terminal device 1 and a normal terminal device 2 transmit PUCCHs with intra-slot frequency hopping, and the reduced capability terminal device sends the PUCCH in the first non-frequency hopping transmission manner. It is assumed that an orthogonal sequence is generated by using a construction formula of an orthogonal sequence in a PUCCH format 1 in an existing NR standard. It can be learned from FIG. 11 that the normal terminal device 1 sends, by using an orthogonal sequence whose length is 3, that is, [0, 1, 2], a first hop of UCI carried on a PUCCH, and sends, by using an orthogonal sequence whose length is 4, that is, [0, 0, 2, 2], a second hop of the UCI carried on the PUCCH. The normal terminal device 2 sends, by using an orthogonal sequence whose length is 3, that is, [0, 2, 1], a first hop of UCI carried on a PUCCH, and sends, by using an orthogonal sequence whose length is 4, that is, [0, 0, 2, 2], a second hop of the UCI carried on the PUCCH. This can ensure orthogonality between PUCCH transmission of the normal terminal device 1 and PUCCH transmission of the normal terminal device 2. The reduced capability terminal device sends a first part of UCI on a PUCCH by using an orthogonal sequence whose length is 3, for example, [0, 1, 2], and sends a second part of the UCI by using an orthogonal sequence whose length is 4, for example, [0, 2, 0, 2]. It can be learned that orthogonality between PUCCH transmission of the reduced capability terminal device and PUCCH transmission of the normal terminal device 1 and normal terminal device 2 can be ensured, to avoid interference to PUCCH transmission of the normal device and ensure PUCCH transmission performance of the normal terminal device.

The foregoing describes two PUCCH transmission manners newly introduced in this embodiment of this application. In addition to the existing PUCCH transmission manners, that is, the intra-slot frequency hopping transmission manner and the second non-frequency hopping transmission manner, there are four PUCCH transmission manners in total.

With reference to the foregoing embodiments and the related accompanying drawings, the following describes which transmission manner in the four PUCCH transmission manners is used by a terminal device for PUCCH sending or receiving. For example, the terminal device may determine the transmission manner, or the network device may indicate the transmission manner to be used by the terminal device.

Figure 12:
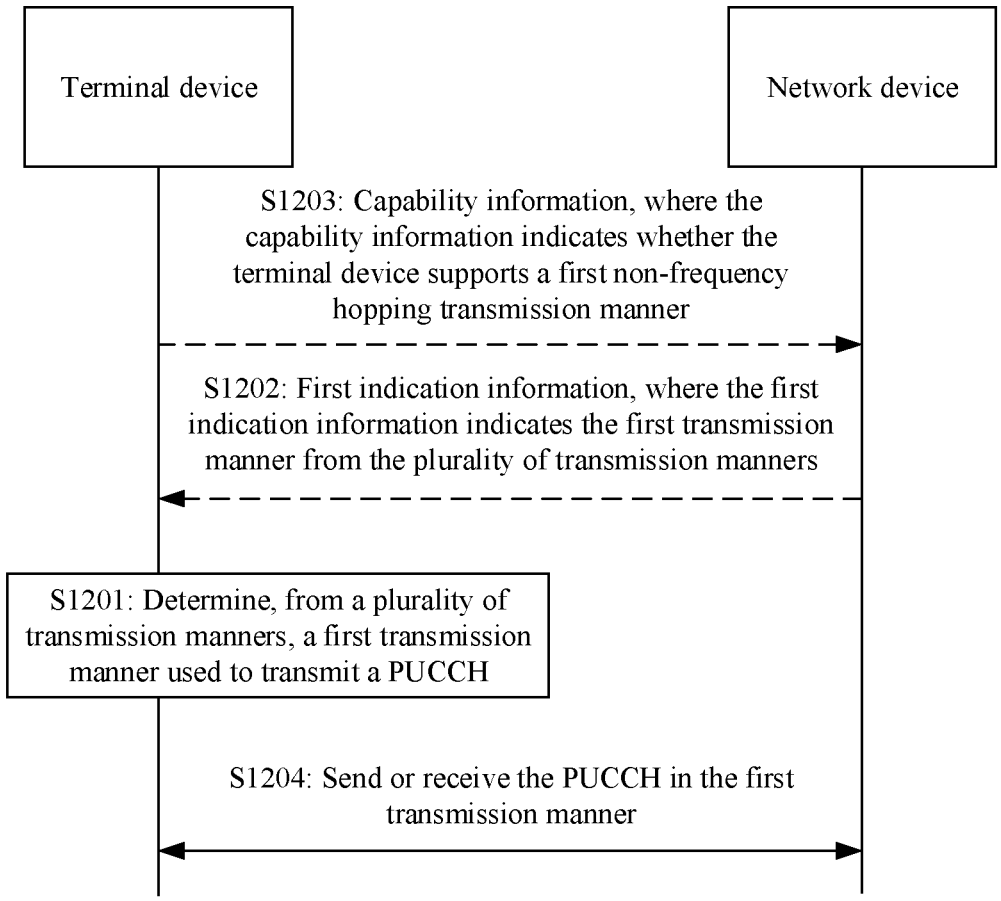
FIG. 12 is a flowchart of a PUCCH transmission method according to an embodiment of this application.

Refer to FIG. 12 below. FIG. 12 shows a PUCCH transmission method according to an embodiment of this application. The following description process uses an example in which the method is applied to the network architecture shown in FIG. 1. In addition, the method may be performed by two communication apparatuses. The two communication apparatuses are, for example, a first communication apparatus and a second communication apparatus. The first communication apparatus may be a network device or a communication apparatus that can support a network device in implementing a function required in the method. Alternatively, the first communication apparatus may be a terminal device or a communication apparatus that can support a terminal device in implementing a function required in the method. Certainly, the first communication apparatus may alternatively be another communication apparatus, for example, a chip system. Similarly, the second communication apparatus may be a network device or a communication apparatus that can support the network device in implementing a function required in the method. Alternatively, the second communication apparatus may be a terminal device or a communication apparatus that can support the terminal device in implementing a function required in the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device. Alternatively, both the first communication apparatus and the second communication apparatus are network devices. Alternatively, both the first communication apparatus and the second communication apparatus are terminal devices. Alternatively, the first communication apparatus is a network device, and the second communication apparatus is a communication apparatus that can support a terminal device in implementing a function required in the method. The network device is, for example, a base station.

For ease of description, in the following, an example in which the method is performed by a network device and a terminal device is used. In other words, an example in which the first communication apparatus is a network device and the second communication apparatus is a terminal device is used. If this embodiment is applied to the network architecture shown in FIG. 1, the network device described below may be a network device in the network architecture shown in FIG. 1. It should be noted that this embodiment of this application is merely described by using a network device and a terminal device as an example, and is not limited to the two communication apparatuses. For example, the embodiments of this application may also be performed by a terminal device and a terminal device, that is, both communication ends are terminal devices.

S1201: A terminal device determines, from a plurality of transmission manners, a first transmission manner used to transmit a PUCCH.

In this embodiment of this application, there are four transmission manners used to transmit a PUCCH. The four transmission manners are respectively a first non-frequency hopping transmission manner, a second non-frequency hopping transmission manner, an intra-time unit frequency hopping transmission manner, and an inter-time unit frequency hopping transmission manner. Before sending or receiving the PUCCH, the terminal device may determine, from the plurality of transmission manners, the first transmission manner used for sending or receiving the PUCCH. The plurality of transmission manners may include at least two of the foregoing four transmission manners. For example, the plurality of transmission manners include the first non-frequency hopping transmission manner and the second non-frequency hopping transmission manner; the plurality of transmission manners include the first non-frequency hopping transmission manner and the intra-time unit frequency hopping transmission manner; the plurality of transmission manners include the inter-time unit frequency hopping transmission manner and the second non-frequency hopping transmission manner; the plurality of transmission manners include the inter-time unit frequency hopping transmission manner and the intra-time unit frequency hopping transmission manner; the plurality of transmission manners include the first non-frequency hopping transmission manner, the second non-frequency hopping transmission manner, and the inter-time unit frequency hopping transmission manner; the plurality of transmission manners include the inter-time unit frequency hopping transmission manner, the second non-frequency hopping transmission manner, and the intra-time unit frequency hopping transmission; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In this embodiment of this application, determining the first transmission manner from the plurality of transmission manners includes the following two transmission manners:

Determining manner 1: The terminal device may determine the first transmission manner based on an indication of a network device.

For example, in S1202, a network device sends first indication information to the terminal device, and correspondingly, the terminal device receives the first indication information.

The first indication information may indicate any one of the plurality of transmission manners, for example, the first transmission manner. The first indication information may be carried in one or more of radio resource control (RRC) signaling, media access control element (MAC CE) signaling, downlink control information (DCI) signaling, or the like. The one or more fields may be a field defined in the RRC signaling, a field defined in the MAC CE signaling, or a field defined in the DCI signaling, or may be an RRC field, a MAC CE field, or a DCI field newly defined. This is not limited in this embodiment of this application. Certainly, the first indication information may alternatively be carried in newly defined signaling.

The first indication information may occupy one or more bits, and different bit states correspond to different PUCCH transmission manners.

For example, the plurality of transmission manners include two transmission manners, and the first indication information occupies 1 bit. For example, the plurality of transmission manners include the first non-frequency hopping transmission manner and the second non-frequency hopping transmission manner. The bit in a state of "0" may indicate the first non-frequency hopping transmission manner, and the bit in a state of "1" may indicate the second non-frequency hopping transmission manner. Alternatively, the bit in a state of "0" may indicate the second non-frequency hopping transmission manner, and the bit in a state of "1" may indicate the first non-frequency hopping transmission manner.

For another example, the plurality of transmission manners include at least three transmission manners, and the first indication information may occupy at least 2 bits. For example, for specific indication content of the first indication information, refer to Table 5.

TABLE 5

| Bit state of first information | Indication content |
| --- | --- |
| 00 | First non-frequency hopping transmission manner |
| 01 | Second non-frequency hopping transmission manner |
| 10 | Intra-time unit frequency hopping transmission manner |
| 11 | Inter-time unit frequency hopping transmission manner, reserved, or used as another indication |

It may be understood that different terminal devices separately send PUCCHs in an intra-slot frequency hopping transmission manner and an intra-slot non-frequency hopping transmission manner. If a frequency domain resource corresponding to the PUCCH does not start from a lowest frequency or a highest frequency of a carrier bandwidth, resource fragmentation may occur, and consequently, an uplink transmission rate is low. To avoid uplink resource fragmentation as much as possible, in this embodiment of this application, a new manner of determining an RB index of a PUCCH is provided for the second non-frequency hopping transmission manner.

In an example, the RB index of the PUCCH may be determined according to a first rule. For example, the first rule is: $0 \leq r_{PUCCH} \leq (X/2)-1$, and the RB index value of the PUCCH is equal to $RB_{BWP}^{offset}+\lfloor r_{PUCCH}/N_{CS} \rfloor$; and/or $X/2 \leq r_{PUCCH} \leq X-1$, and the RB index value of the PUCCH is equal to $N_{BWP}^{size}-1-RB_{BWP}^{offset}-\lfloor (r_{PUCCH}-8)/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, and $N_{BWP}^{Size}$ is a size of a bandwidth part BWP on which the PUCCH resource is configured. It may be understood that X is a positive integer, for example, X=16. According to the first rule, X/2 PUCCH resources of the X PUCCH resources are located on one side of the BWP (or carrier bandwidth), and the other X/2 PUCCH resources are on the other side of the BWP (carrier). It should be noted that one side of the BWP (or carrier bandwidth) in this specification refers to starting from a lowest frequency location or a highest frequency location of (or the carrier bandwidth).

In another example, the RB index of the PUCCH may be determined according to a second rule. For example, the second rule is: $0 \leq r_{PUCCH} \leq X-1$, and the RB index value of the PUCCH is equal to $RB_{BWP}^{offset} + \lfloor r_{PUCCH}/N_{CS} \rfloor$.

In still another example, the RB index of the PUCCH may be determined according to a third rule. For example, the third rule is: $0 \leq r_{PUCCH} \leq X-1$, and the RB index value of the PUCCH is equal to $N_{BWP}^{size}-1-RB_{BWP}^{offset} + \lfloor r_{PUCCH}/N_{CS} \rfloor$.

It may be understood that the X PUCCH resources are on one side of the BWP (or carrier) according to the second rule. The X PUCCH resources are on the other side of the BWP (carrier) according to the third rule. In other words, the X PUCCH resources may be centralized on one side of the BWP (or carrier) according to the second rule or the third rule, that is, the X PUCCH resources are not distributed on two sides of the BWP. In this way, resource fragmentation of the BWP can be reduced or avoided as much as possible, so that more contiguous resources can be allocated to the terminal device as much as possible, and impact on a transmission rate of the terminal device is reduced.

Alternatively, the plurality of rules include the first rule and the second rule. The first rule is: if $0 \leq r_{PUCCH} \leq (X/2)-1$, the RB index of the PUCCH is $RB_{BWP}^{offset} + \lfloor r_{PUCCH}/N_{CS} \rfloor$; and if $X \leq r_{PUCCH} \leq X-1$, the RB index of the PUCCH is $N_{BWP}^{size}-1-RB_{BWP}^{offset} - \lfloor (r_{PUCCH}-8)/N_{CS} \rfloor$. X is an integer, for example, X=16.

The second rule is: if $0 \leq r_{PUCCH} \leq X-1$, the RB index of the PUCCH is $RB_{BWP}^{offset} + \lfloor r_{PUCCH}/N_{CS} \rfloor$; and if $X \leq r_{PUCCH} \leq 2X-1$, the RB index of the PUCCH is $N_{BWP}^{size} - 1 - RB_{BWP}^{offset} - floor((r_{PUCCH}-16)/Ncs)$. floor is a round-down function. X is a positive integer greater than 16. For example, X=31.

In this case, according to the first rule, X/2 PUCCH resources in X PUCCH resources are on one side of a BWP (or carrier), and X/2 PUCCH resources are on the other side of the BWP (carrier). X is a positive integer. For example, X=16. According to the second rule, X PUCCH resources in 2X PUCCH resources are on one side of a BWP (or carrier), and X PUCCH resources are on the other side of the BWP (carrier). The second rule and the first rule may use a same formula structure. However, according to the second rule, if the PUCCH index indicated by the network device to the terminal device does not exceed X, the PUCCH resources of the terminal device are not scattered on two sides of the BWP, and resource fragmentation of the BWP can be reduced. Therefore, more contiguous resources can be allocated to the terminal device, to reduce impact on a transmission rate of the terminal device.

For the second non-frequency hopping transmission manner, the RB index of the PUCCH may be determined according to the first rule, the second rule, or the third rule. In this embodiment of this application, if the first transmission manner indicated by the network device is the second non-frequency hopping transmission manner, the network device may further indicate an RB index of a resource corresponding to the PUCCH. For example, the network device may indicate, from at least two rules (that is, a plurality of rules) among the first rule, the second rule, and the third rule, a rule (referred to as a used rule in this specification) used to determine the RB index of the PUCCH.

In an implementation, the first indication information may indicate both the second non-frequency hopping transmission manner and the used rule. The terminal device may obtain the used rule based on the first indication information.

The first indication information may occupy a plurality of bits. Refer to Table 6 for an example. The first indication information may occupy 2 bits. In addition to indicating PUCCH transmission without frequency hopping, the first indication information further indicates a rule for determining a resource block of the PUCCH, so that signaling overheads can be reduced while the PUCCH transmission manner is flexibly indicated.

TABLE 6

| Bit state of first indication information | Indication of the first indication information |
|---|---|
| 00 | Intra-time unit frequency hopping transmission manner |
| 01 | Second non-frequency hopping transmission manner, and an RB index of a PUCCH is determined according to a first rule. |
| 10 | Second non-frequency hopping transmission manner, and an RB index of a PUCCH is determined according to a second rule. |
| 11 | Second non-frequency hopping transmission manner, and an RB index of a PUCCH is determined according to a third rule. |

It should be noted that Table 6 is merely an example. A correspondence between the bit state of the first indication information and the content indicated by the first indication information is not limited in this embodiment of this application. For example, another form of Table 6 may be shown in Table 7.

TABLE 7

| Bit state of first indication information | Indication of the first indication information |
|---|---|
| 00 | Second non-frequency hopping transmission manner, and an RB index of a PUCCH is determined according to a first rule. |
| 01 | Second non-frequency hopping transmission manner, and an RB index of a PUCCH is determined according to a second rule. |
| 10 | Second non-frequency hopping transmission manner, and an RB index of a PUCCH is determined according to a third rule. |
| 11 | Intra-time unit frequency hopping transmission manner |

In a second implementation, the first indication information may indicate the second non-frequency hopping transmission manner, and the network device may indicate the used rule by using second indication information. In this case, the network device may send the first indication information and the second indication information to the terminal device, and correspondingly, the terminal device receives the first indication information and the second indication information. The terminal device may obtain the used rule based on the second indication information. Refer to Table 8 for an example. The first indication information may occupy 1 bit. Refer to Table 9. The second indication information may occupy 2 bits. Alternatively, refer to Table 10. The second indication information may occupy 1 bit.

TABLE 8

| Bit state of first indication information | Indication of the first indication information |
|---|---|
| 0 | Second non-frequency hopping transmission manner |
| 1 | Intra-time unit frequency hopping transmission manner |

TABLE 9

| Bit state of second indication information | Indication of the second indication information |
|---|---|
| 00 | Second non-frequency hopping transmission manner, and an RB index of a PUCCH is determined according to a first rule. |
| 01 | Second non-frequency hopping transmission manner, and an RB index of a PUCCH is determined according to a second rule. |
| 10 | Second non-frequency hopping transmission manner, and an RB index of a PUCCH is determined according to a third rule. |
| 11 | Reserved or used as another indication |

TABLE 10

| Bit state of second indication information | Indication of the second indication information |
|---|---|
| 0 | Second non-frequency hopping transmission manner, and an RB index of a PUCCH is determined according to a first rule. |
| 1 | Second non-frequency hopping transmission manner, and an RB index of a PUCCH is determined according to a second rule. |

It should be noted that Table 8 to Table 10 are merely examples. In this embodiment of this application, a correspondence between the bit state of the first indication information and the content indicated by the first indication information is not limited, and a correspondence between the bit state of the second indication information and the content indicated by the second indication information is not limited.

Another implementation of this application is illustrated below. First indication information indicates a PUCCH transmission manner from a plurality of transmission manners. The plurality of transmission manners include at least the second non-frequency hopping transmission manner and the intra-time unit frequency hopping transmission manner. When the first indication information indicates that the PUCCH transmission manner is the second non-frequency hopping transmission manner, the network device may further send second indication information to the terminal device. That the network device may further send the second indication information to the terminal device means that the second indication information may be optionally present. The network device may send the second indication information to the terminal device, or the network device may not send the second indication information to the terminal device. If the second indication information is present, the network device indicates, by using the second indication information, a rule used by the terminal device to determine the RB index of the PUCCH from a plurality of rules. If the second indication information is present, the terminal device receives the second indication information, and determines, based on an indication of the second indication information, the rule used to determine the RB index of the PUCCH from the plurality of rules. When the second indication information is absent, the terminal device determines the RB index of the PUCCH according to a default rule, and sends the PUCCH. When the second indication information is absent, the network device also determines the RB index of the PUCCH according to the default rule, and receives the PUCCH. The terminal device may obtain identification information, and determine, based on the identification information, whether the second indication information is present. For example, the identification information is a bit in ASN.1.

For example, the plurality of rules include at least the second rule and the third rule. For example, the plurality of rules include only the second rule and the third rule. For example, the plurality of rules include only the first rule, the second rule, and the third rule. For example, the default rule is the first rule. It should be noted that the first rule, the second rule, and the third rule herein are described above, and details are not described herein again.

An embodiment is provided in the following. For example, the first indication information is 1 bit. The plurality of transmission manners include the second non-frequency hopping transmission manner and the intra-time unit frequency hopping transmission manner. The bit of the first indication information is 0, and the first indication information indicates that the PUCCH transmission manner is the second non-frequency hopping transmission manner. The bit of the first indication information is 1, and the first indication information indicates that the PUCCH transmission manner is the intra-time unit frequency hopping transmission manner. When the PUCCH transmission manner is the second non-frequency hopping transmission manner, if the second indication information is present, the second indication information may indicate the terminal device to determine the RB index of the PUCCH according to either of two different rules. For example, the two different rules include the second rule and the third rule. For example, the second indication information is 1 bit. The bit of the second indication information is 0, and the second indication information indicates the terminal device to determine the RB index of the PUCCH according to the second rule. The bit of the second indication information is 1, and the second indication information indicates the terminal device to determine the RB index of the PUCCH according to the third rule.

When the PUCCH transmission manner is the second non-frequency hopping transmission manner, if the second indication information is absent, the terminal device determines the RB index of the PUCCH according to the default first rule. When the PUCCH transmission manner is the second non-frequency hopping transmission manner, if the second indication information is absent, the network device determines the RB index of the PUCCH according to the default first rule, and receives the PUCCH. For example, content indicated by the first indication information may be shown in Table 11, and content indicated by the second indication information may be shown in Table 12.

TABLE 11

| Bit state of first indication information | Indication of the first indication information |
|---|---|
| 0 | Second non-frequency hopping transmission manner |
| 1 | Intra-time unit frequency hopping transmission manner |

TABLE 12

| Bit state of second indication information | Indication of the second indication information |
|---|---|
| 0 | Second non-frequency hopping transmission manner, and an RB index of a PUCCH is determined according to a second rule. |
| 1 | Second non-frequency hopping transmission manner, and an RB index of a PUCCH is determined according to a third rule. |

It should be noted that the first indication information is higher layer signaling, and the second indication information is physical layer signaling. Alternatively, the first indication information is physical layer signaling, and the second indication information is higher layer signaling. Alternatively, the first indication information is higher layer signaling, and the second indication information is higher layer signaling. Alternatively, the first indication information is physical layer signaling, and the second indication information is physical layer signaling.

In a third implementation, the first indication information may indicate the second non-frequency hopping transmission manner, and the network device may indicate the used rule by using third indication information. In this case, the network device may send the first indication information and the third indication information to the terminal device, and correspondingly, the terminal device receives the first indication information and the third indication information. The terminal device may obtain the used rule based on the third indication information. In other words, if the first indication information indicates that the first transmission manner is the second non-frequency hopping transmission manner, the terminal device further obtains the third indication information.

In an implementation, the third indication information indicates a value of m, and the terminal device may determine the RB index of the PUCCH based on the value of m. For example, $0 \leq r_{PUCCH} \leq 8m-1$, and the RB index value of the PUCCH is equal to $RB_{BWP}^{offset} + \lfloor r_{PUCCH}/N_{CS} \rfloor$. If $8m \leq r_{PUCCH} \leq 16m-1$, the RB index value of the PUCCH is equal to $N_{BWP}^{size} - 1 - RB_{BWP}^{offset} - floor((r_{PUCCH}-8m)/Ncs)$. floor is a round-down function.

For example, the first indication information may occupy 1 bit, and indicated content may be shown in Table 8. The third indication information may occupy 1 bit, and indicated content may be shown in Table 13. When the first transmission manner is the second non-frequency hopping transmission manner, the network device may send the third indication information, so that signaling overheads can be reduced while the PUCCH transmission manner is flexibly indicated.

TABLE 13

| Bit state of third indication information | Indication of the third indication information |
|---|---|
| 0 | m = 1 |
| 1 | m = 2 |

It may be understood that the third indication information and the first indication information may be same signaling. It may also be considered that the first indication information indicates the first transmission manner and the value of m. Alternatively, the first indication information indicates the value of m, and may indirectly or implicitly indicate whether the PUCCH transmission manner is the second non-frequency hopping transmission manner or the intra-time unit frequency hopping transmission manner. For example, the first indication information occupies 1 bit. In an example, if the bit state of the first indication information is 0, m=1. Correspondingly, if the bit state of the first indication information is 1, m=2. When m=1, the PUCCH transmission manner is the intra-time unit frequency hopping transmission manner. When m=2, the PUCCH transmission manner is the second non-frequency hopping transmission manner.

It should be noted that the first indication information is higher layer signaling, and the third indication information is physical layer signaling. Alternatively, the first indication information is physical layer signaling, and the third indication information is higher layer signaling. Alternatively, the first indication information is higher layer signaling, and the third indication information is higher layer signaling. Alternatively, the first indication information is physical layer signaling, and the third indication information is physical layer signaling.

In a fourth implementation, the network device may indicate the second rule or the third rule by using 1-bit information. For example, the network device sends fourth indication information to the terminal device, and one state of the fourth indication information corresponds to one rule. For example, the fourth indication information occupies 1 bit. The bit state of the fourth indication information is 0, and the RB index of the PUCCH is $RB_{BWP}^{offset} + \lfloor r_{PUCCH}/N_{CS} \rfloor$. The bit state of the fourth indication information is 1, and the RB index of the PUCCH is $N_{BWP}^{size} - 1 - RB_{BWP}^{offset} + \lfloor r_{PUCCH}/N_{CS} \rfloor$.

It should be noted that the first indication information is higher layer signaling, and the fourth indication information is physical layer signaling. Alternatively, the first indication information is physical layer signaling, and the fourth indication information is higher layer signaling. Alternatively, the first indication information is higher layer signaling, and the fourth indication information is higher layer signaling. Alternatively, the first indication information is physical layer signaling, and the fourth indication information is physical layer signaling.

S1203: The terminal device sends capability information to the network device, and correspondingly, the network device receives the capability information. The capability information indicates whether the terminal device supports the first non-frequency hopping transmission manner, and/or, the first capability information indicates whether the terminal device determines the RB index of the PUCCH according to the second rule, and/or, the first capability information indicates whether the terminal device determines the RB index of the PUCCH according to third rule, and/or the first capability information indicates whether the terminal device supports m=2.

That the capability information indicates whether the terminal device supports the first non-frequency hopping transmission manner may also be understood as that the capability information can feed back whether the terminal device supports the first non-frequency hopping transmission manner. Different terminal devices have different capabilities. Some terminal devices support the first non-frequency hopping transmission manner, and some terminal devices do not support the first non-frequency hopping transmission manner. If the network device indicates a terminal device that does not support the first non-frequency hopping transmission manner to transmit a PUCCH in the first non-frequency hopping transmission manner, it is obviously inappropriate. Therefore, in this embodiment of this application, the network device may determine the first transmission manner from the plurality of transmission manners based on the capability information reported by the terminal device, to avoid mismatching between the determined transmission manner and the capability of the terminal device. Certainly, if the terminal device does not send the capability information to the network device, it may be considered by default the terminal device supports the first non-frequency hopping transmission manner. That is, S1203 is an optional step, and is shown by using a dashed line in FIG. 12.

In some embodiments, the first indication information may alternatively indicate whether the terminal device supports the inter-time unit frequency hopping transmission manner. The network device determines, based on the first indication information, whether to indicate the terminal device to send the PUCCH in the inter-time unit frequency hopping transmission manner. Alternatively, in some embodiments, the first indication information may indicate whether the terminal device supports the first non-frequency hopping transmission manner and the inter-time unit frequency hopping transmission manner.

Similar to the first indication information, the capability information may alternatively be carried in one or more of RRC signaling, MAC CE signaling, UCI signaling, or the like. The one or more fields may be a field defined in the RRC signaling, a field defined in the MAC CE signaling, or a field defined in the UCI signaling, or may be an RRC field, a MAC CE field, or a UCI field newly defined. This is not limited in this embodiment of this application. Certainly, the capability information may also be carried in newly defined signaling.

It should be noted that an implementation of the capability information is not limited in this embodiment of this application. The capability information may directly indicate whether the terminal device supports the first non-frequency hopping transmission manner, and/or directly indicate whether the terminal device supports the inter-time unit frequency hopping transmission manner. For example, the first indication information and the capability information may be carried in different signaling or different fields of same signaling. The capability information may indirectly indicate whether the terminal device supports the first non-frequency hopping transmission manner, and/or indirectly indicate whether the terminal device supports the inter-time unit frequency hopping transmission manner. For example, whether the terminal device supports the first non-frequency hopping transmission manner may be indicated by indicating whether a field carrying the capability information is present. If the field carrying the capability information is present, it may indicate that the terminal device does not support the first non-frequency hopping transmission manner. Correspondingly, if the field carrying the capability information is absent, it may indicate that the terminal device supports the first non-frequency hopping transmission manner.

After receiving the first indication information from the network device, the terminal device may determine, according to Table 5, the transmission manner used for PUCCH transmission. It should be understood that a plurality of terminal devices share a PUCCH resource. In addition to determining the PUCCH transmission manner, the terminal device further needs to determine an index of an orthogonal sequence whose length is Li, where i=1, 2, 3, 4, 5, or 6.

For example, if the terminal device uses the first non-frequency hopping transmission manner, the terminal device needs to determine an index of an orthogonal sequence whose length is L1 for sending a first part of UCI, and an index of an orthogonal sequence whose length is L2 for sending a second part of the UCI, and/or the terminal device needs to determine an index of an orthogonal sequence whose length is L3 for sending a first part of a DMRS and an index of an orthogonal sequence whose length is L4 for sending a second part of the DMRS.

The network device may indicate the index of the orthogonal sequence by using index indication information, to notify the terminal device of the orthogonal sequence for sending the UCI and/or the DMRS.

As described above, if it is pre-specified that indexes of orthogonal sequences with a same length are the same, for example, Li=Lj, an index of an orthogonal sequence whose length is Li is the same as an index of an orthogonal sequence whose length is Lj. The terminal only needs to determine the index of the orthogonal sequence whose length is Li, to determine the index of the orthogonal sequence whose length is Lj; or the terminal only needs to determine the index of the orthogonal sequence whose length is Lj, to determine the index of the orthogonal sequence whose length is Li. In this case, the network device may send index indication information, for example, first index indication information, to the terminal device, to indicate the index of the orthogonal sequence whose length is Li. The terminal device may determine, based on the first index indication information, the index of the orthogonal sequence whose length is Li and the index of the orthogonal sequence whose length is Lj, to determine the orthogonal sequence whose length is Li and the orthogonal sequence whose length is Lj.

If it is specified that indexes of orthogonal sequences with different lengths are different, for example, Li Lj, an index of an orthogonal sequence whose length is Li is different from an index of an orthogonal sequence whose length is Lj. In this case, the network device may separately indicate the index of the orthogonal sequence whose length is Li and the index of the orthogonal sequence whose length is Lj. For example, the network device sends second index indication information and third index indication information to the terminal device. The second index indication information indicates the index of the orthogonal sequence whose length is Li, and the third index indication indicates the index of the orthogonal sequence whose length is Lj. The terminal device may determine, based on the second index indication information, the index of the orthogonal sequence whose length is Li, and determine, based on the third index indication information, the index of the orthogonal sequence whose length is Lj, to determine the orthogonal sequence whose length is Li and the orthogonal sequence whose length is Lj.

Determining manner 2: The terminal device determines the first transmission manner according to a pre-specified rule (also referred to as a preset rule).

The pre-specified rule may be that a reduced capability terminal device sends a PUCCH in the first transmission manner. If the terminal device is a reduced capability terminal device, the terminal device sends the PUCCH in the first transmission manner by default. The pre-specified rule may also be that if a reduced capability terminal device determines that a normal terminal device sends a PUCCH in a frequency hopping transmission manner, the reduced capability terminal device sends the PUCCH in the first transmission manner by default.

It should be understood that because the terminal device may determine the first transmission manner according to the preset rule, S1202 is an optional step. Therefore, a dashed line is used for illustration in FIG. 12.

It should be understood that the network device may also receive the PUCCH from the terminal device according to a pre-specified rule. For example, if the network device determines to receive a PUCCH from a reduced capability terminal device, the network device receives the PUCCH from the reduced capability terminal device in the first transmission manner. If the network device determines to separately receive PUCCHs from a reduced capability terminal device and a normal terminal device, and determines that the normal terminal device sends the PUCCH in a frequency hopping transmission manner, the network device receives the PUCCH from the reduced capability terminal device in the first transmission manner.

S1204. The terminal device sends the PUCCH in the determined first transmission manner, and correspondingly, the network device receives the PUCCH.

After determining the PUCCH transmission manner, for example, the first transmission manner, and determining the related orthogonal sequence for sending the PUCCH, the terminal device may send or receive the PUCCH.

For example, a reduced capability terminal device determines to transmit a PUCCH in the inter-time unit frequency hopping transmission manner. Because there is a specific quantity of symbols between a first hop and a second hop of the PUCCH in the inter-time unit frequency hopping transmission manner, even if the reduced capability terminal device sends or receives the PUCCH within a frequency range that exceeds a maximum channel bandwidth capability of the reduced capability terminal device, frequency retuning may be performed on the specific quantity of symbols, and sending and/or receiving of the PUCCH is not affected. In this way, degraded PUCCH transmission performance of the reduced capability terminal device can be avoided.

For another example, a reduced capability terminal device determines to send a PUCCH in the first non-frequency hopping transmission manner. Because UCI and a DMRS on the PUCCH are separately divided into two parts, the UCI and the DMRS are sent without frequency hopping by using orthogonal sequences with a same length or different lengths. Even if a normal terminal device and a reduced capability terminal device share a PUCCH resource, orthogonality between PUCCH transmission of the normal terminal device and PUCCH transmission of the reduced capability terminal device can still be ensured, to avoid interference to PUCCH transmission of the normal device, and ensure PUCCH transmission performance of the normal terminal device.

The foregoing embodiments of this application describe the method provided in embodiments of this application from a perspective of interaction between the terminal device and the network device. The steps performed by the network device may also be separately implemented by different communication apparatuses. For example, a first apparatus is configured to determine the first transmission manner from the plurality of transmission manners, and a second apparatus is configured to send the PUCCH in the first transmission manner. In other words, the first apparatus and the second apparatus jointly complete the steps performed by the network device in embodiments of this application. A division manner is not limited in this application. When the network architecture includes one or more distributed units (DU), one or more centralized units (CU), and one or more radio frequency units (RU), the steps performed by the network device may be separately implemented by the DU, the CU, and the RU. To implement functions in the foregoing methods provided in embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on applications and design constraints of the technical solutions.

Based on a same concept as that of the method embodiments, an embodiment of this application provides a communication apparatus. The following describes communication apparatuses for implementing the foregoing methods in embodiments of this application with reference to the accompanying drawings.

Figure 13:
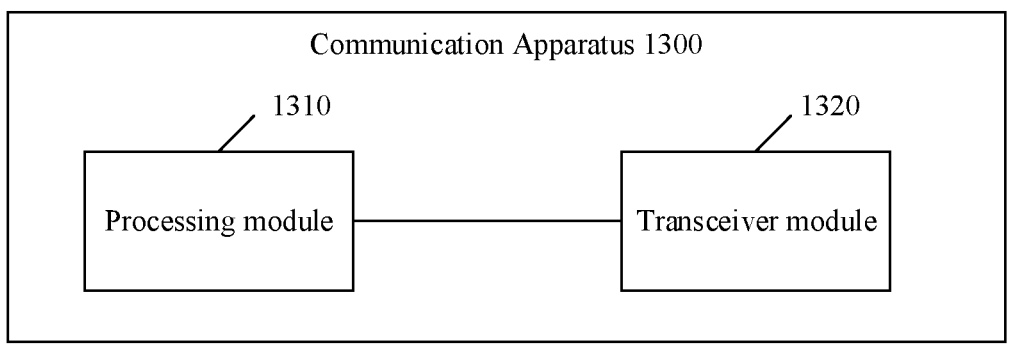
FIG. 13 is a diagram depicting a structure of a communication apparatus according to an embodiment of this application.

FIG. 13 is a diagram of a communication apparatus 1300 according to an embodiment of this application. The communication apparatus 1300 may include a processing module 1310 and a transceiver module 1320. Optionally, the communication apparatus may further include a storage unit. The storage unit may be configured to store instructions (code or a program) and/or data. The processing module 1310 and the transceiver module 1320 may be coupled to the storage unit. For example, the processing module 1310 may read the instructions (the code or the program) and/or the data in the storage unit, to implement a corresponding method. The foregoing units may be disposed independently, or may be partially or completely integrated.

In some implementations, the communication apparatus 1300 may correspondingly implement behavior and functions of the terminal device in the foregoing method embodiments, for example, implement the method performed by the terminal device in the embodiment in FIG. 12. For example, the communication apparatus 1300 may be a terminal device, a component (for example, a chip or a circuit) used in the terminal device, a chip or a chip set in the terminal device, or a part that is of a chip and that is configured to perform a related method function. The transceiver module 1320 may be configured to perform all sending and receiving operations performed by the terminal device in the embodiment shown in FIG. 12, for example, S1202, S1203, and S1204 in the embodiment shown in FIG. 12, and/or configured to support another process of the technology described in this specification. The processing module 1310 may be configured to perform all operations, other than the sending and receiving operations, performed by the terminal device in the embodiment shown in FIG. 12, for example, S1201 in the embodiment shown in FIG. 12, and/or configured to support another process of the technology described in this specification.

In some embodiments, the processing module 1310 is configured to determine a first transmission manner from a plurality of transmission manners, and the transceiver module 1320 is configured to send a PUCCH in the first transmission manner. The plurality of transmission manners include a first non-frequency hopping transmission manner and/or an inter-time unit frequency hopping transmission manner; or the plurality of transmission manners include a second non-frequency hopping transmission manner and an intra-time unit frequency hopping transmission manner, and the plurality of transmission manners do not include the first non-frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers;

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an implementation, the processing module 1310 is configured to:
determine the first transmission manner from the plurality of transmission manners based on first indication information and/or a pre-specified rule, where the first indication information indicates the first transmission manner.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an implementation, the first indication information indicates at least one of the following:
the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and the processing module 1310 is further configured to obtain, based on the first indication information, a rule used for determining an RB location of the PUCCH, where the first indication information indicates the used rule from a plurality of rules.

In an implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset}+\lfloor r_{PUCCH}/N_{CS} \rfloor$; and/or $X/2 \leq r_{PUCCH} \leq X-1$ and the RB index value of the PUCCH is equal to $N_{BWP}^{size}-1-RB_{BWP}^{offset}-\lfloor (r_{PUCCH}-8)/N_{CS} \rfloor$.

The second rule is: $0 \leq r_{PUCCH} \leq X-1$, and an RB index value of the PUCCH is equal to $RB_{BWP}^{offset}+\lfloor r_{PUCCH}/N_{CS} \rfloor$.

The third rule is: $0 \leq r_{PUCCH} \leq X-1$, and an RB index value of the PUCCH is equal to $N_{BWP}^{size}-1-RB_{BWP}^{offset}+\lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured, and X is an integer.

In an implementation, the processing module 1310 is further configured to:
determine indexes of orthogonal sequences whose lengths are Li and Lj, where i=1, 2, 3, 4, 5, or 6, and j=1, 2, 3, 4, 5 or 6; and if i=j, determine the index of the orthogonal sequence whose length is Li and the index of the orthogonal sequence whose length is Lj based on first index indication information; or
if i≠j, determine the index of the orthogonal sequence whose length is Li based on second index indication information, and determine the index of the orthogonal sequence whose length is Lj based on third index indication information.

In an implementation, the transceiver module 1320 is further configured to send first capability information to a network device. The first capability information indicates at least one of the following: whether the first non-frequency hopping transmission manner is supported, whether the inter-time unit frequency hopping transmission manner is supported, whether the terminal device determines the RB index of the PUCCH according to the second rule, whether the terminal device determines the RB index of the PUCCH according to the third rule, or whether the terminal device supports m=2.

In some implementations, the communication apparatus 1300 may correspondingly implement behavior and functions of the network device in the foregoing method embodiments, for example, implement the method performed by the network device in the embodiment in FIG. 12. For example, the communication apparatus 1300 may be a network device, a component (for example, a chip or a circuit) used in the network device, a chip or a chip set in the network device, or a part that is of a chip and that is configured to perform a related method function. The transceiver module 1320 may be configured to perform all sending and receiving operations performed by the network device in the embodiment shown in FIG. 12, for example, S1202, S1203, and S1204 in the embodiment shown in FIG. 12, and/or configured to support another process of the technology described in this specification. The processing module 1310 is configured to perform all operations, other than the sending and receiving operations, performed by a base station in the embodiment shown in FIG. 12, and/or configured to support another process of the technology described in this specification.

In some embodiments, the processing module 1310 is configured to generate first indication information, and the transceiver module 1320 is configured to send the first indication information. The first indication information indicates a first transmission manner from a plurality of transmission manners. The plurality of transmission manners include a first non-frequency hopping transmission manner and/or an inter-time unit frequency hopping transmission manner. Alternatively, the plurality of transmission manners include a second non-frequency hopping transmission manner and an intra-time unit frequency hopping transmission manner, and the plurality of transmission manners do not include the first non-frequency hopping transmission manner.

The first non-frequency hopping transmission manner is: sending the PUCCH without frequency hopping in a time unit, where UCI on the PUCCH includes a first part and a second part, the first part is transmitted by using an orthogonal sequence whose length is L1, and the second part is sent by using an orthogonal sequence whose length is L2; and/or sending the PUCCH without frequency hopping in a time unit, where a DMRS on the PUCCH includes a third part and a fourth part, the third part is sent by using an orthogonal sequence whose length is L3, the fourth part is sent by using an orthogonal sequence whose length is L4, and Li (i=1, 2, 3, or 4) is a positive integer.

The inter-time unit frequency hopping transmission manner is: sending a first hop of the PUCCH by using F symbols in an $n^{th}$ time unit, and sending a second hop of the PUCCH by using L-F symbols in an $(n+1)^{th}$ time unit. A PUCCH length is L symbols, there is an interval of 14-F symbols between a last symbol in the F symbols and a first symbol in the L-F symbols, and F and L are positive integers.

The second non-frequency hopping transmission manner is: sending the PUCCH without frequency hopping in a time unit, where UCI on the PUCCH is sent by using an orthogonal sequence whose length is L5, a DMRS on the PUCCH is sent by using an orthogonal sequence whose length is L6, and Li (i=5 or 6) is an integer.

The intra-time unit frequency hopping transmission manner is: transmitting the PUCCH with frequency hopping in a time unit.

In an implementation, the plurality of transmission manners include the first non-frequency hopping transmission manner and the second non-frequency hopping transmission manner; or the plurality of transmission manners include the first non-frequency hopping transmission manner and the intra-time unit frequency hopping transmission manner; or the plurality of transmission manners include the first non-frequency hopping transmission manner, the second non-frequency hopping transmission manner, and the intra-time unit frequency hopping transmission manner; or the plurality of transmission manners include the first non-frequency hopping transmission manner, the second non-frequency hopping transmission manner, the intra-time unit frequency hopping transmission manner, and the inter-time unit frequency hopping transmission manner. Alternatively, the plurality of transmission manners include the second non-frequency hopping transmission manner and the intra-time unit frequency hopping transmission manner, and the plurality of transmission manners do not include the first non-frequency hopping transmission manner.

In an implementation, the first indication information indicates at least one of the following:
the first non-frequency hopping transmission manner, the second non-frequency hopping transmission manner, the intra-time unit frequency hopping transmission manner, and the inter-time unit frequency hopping transmission manner.

In an implementation, the first transmission manner is the second non-frequency hopping transmission manner, and the first indication information further indicates, from a plurality of rules, a rule used for determining a resource block RB location of the PUCCH.

In an implementation, the plurality of rules include at least two rules of a first rule, a second rule, and a third rule.

The first rule is: $0 \leq r_{PUCCH} \leq (X/2)-1$, and an RB index value of the PUCCH is equal to $RB_{BWP}^{offset} + \lfloor r_{PUCCH}/N_{CS} \rfloor$; and/or $X/2 \leq r_{PUCCH} \leq X-1$ and the RB index value of the PUCCH is equal to $N_{BWP}^{size}-1-RB_{BWP}^{offset} - \lfloor (r_{PUCCH}-8)/N_{CS} \rfloor$.

The second rule is: $0 \leq r_{PUCCH} \leq X-1$, and an RB index value of the PUCCH is equal to $RB_{BWP}^{offset} + \lfloor r_{PUCCH}/N_{CS} \rfloor$.

The third rule is: $0 \leq r_{PUCCH} \leq X-1$, and an RB index value of the PUCCH is equal to $N_{BWP}^{size}-1-RB_{BWP}^{offset} + \lfloor r_{PUCCH}/N_{CS} \rfloor$. $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured, and X is an integer.

In an implementation, the transceiver module 1320 is further configured to:
send first index indication information, where the first index indication information indicates an orthogonal sequence whose length is Li and an orthogonal sequence whose length is Lj, i=1, 2, 3, 4, 5 or 6, j=1, 2, 3, 4, 5 or 6, and i=j; or
send second index indication information and third index indication information, where the second index indication information indicates an orthogonal sequence whose length is Li, and the third index indication information indicates an orthogonal sequence whose length is Lj, i=1, 2, 3, 4, 5 or 6, j=1, 2, 3, 4, 5 or 6, and i≠j.

In an implementation, the transceiver module 1320 is further configured to:
receive first capability information from a terminal device, where the first capability information indicates at least one of the following: whether the first non-frequency hopping transmission manner is supported, whether the inter-time unit frequency hopping transmission manner is supported, whether the terminal device determines the RB index of the PUCCH according to the second rule, whether the terminal device determines the RB index of the PUCCH according to the third rule, or whether the terminal device supports m=2.

In an implementation, the processing module 1310 is configured to generate the first indication information based on the first capability information.

It should be understood that, in this embodiment of this application, the processing module 1310 may be implemented as a processor or a processor-related circuit component, and the transceiver module 1320 may be implemented as a transceiver or a transceiver-related circuit component, or a communication interface.

Figure 14:
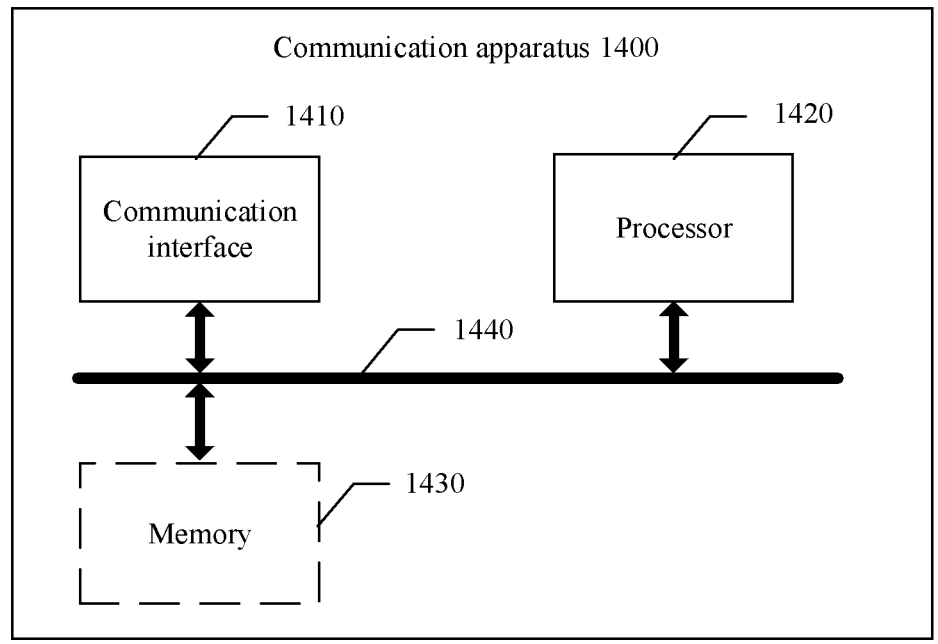
FIG. 14 is a diagram depicting another structure of a communication apparatus according to an embodiment of this application.

FIG. 14 shows a communication apparatus 1400 according to an embodiment of this application. The communication apparatus 1400 may be a terminal device, and may implement a function of the terminal device in the method provided in embodiments of this application. Alternatively, the communication apparatus 1400 may be a network device, and may implement a function of the network device in the method provided in embodiments of this application. Alternatively, the communication apparatus 1400 may be an apparatus that may support a terminal device in implementing a corresponding function in the method provided in embodiments of this application, or may be an apparatus that may support a network device in implementing a corresponding function in the method provided in embodiments of this application. The communication apparatus 1400 may be a chip system. In this embodiment of this application, the chip system may include a chip, or may include a chip and another discrete component.

In hardware implementation, the transceiver module 1320 may be a transceiver, and the transceiver is integrated in the communication apparatus 1400, to form a communication interface 1410.

The communication apparatus 1400 includes at least one processor 1420, configured to implement or support the communication apparatus 1400 in implementing the functions of the network device (base station) or the terminal device in the method provided in embodiments of this application. For details, refer to detailed descriptions in the method example. Details are not described herein again.

The communication apparatus 1400 may further include at least one memory 1430, configured to store program instructions and/or data. The memory 1430 is coupled to the processor 1420. The coupling in this embodiment of this application may be an indirect coupling or a communication connection between apparatuses, units, or modules in an electrical form, a mechanical form, or another form, and is used for information exchange between the apparatuses, the units, or the modules. The processor 1420 may operate with the memory 1430 together. The processor 1420 may execute the program instructions and/or the data stored in the memory 1430, so that the communication apparatus 1400 implements a corresponding method. At least one of the at least one memory may be included in the processor. It should be noted that the memory 1430 is not mandatory, and therefore is shown using a dashed line in FIG. 14.

The communication apparatus 1400 may further include a communication interface 1410, configured to communicate with another device through a transmission medium, so that an apparatus used in the communication apparatus 1400 can communicate with the another device. For example, when the communication apparatus is a terminal, the another device is a network device. Alternatively, when the communication apparatus is a network device, the another device is a terminal. The processor 1420 may send and receive data through the communication interface 1410. The communication interface 1410 may be a transceiver.

A connection medium between the communication interface 1410, the processor 1420, and the memory 1430 is not limited in this embodiment of this application. In this embodiment of this application, in FIG. 14, the memory 1430, the processor 1420, and the communication interface 1410 are connected through a bus 1440. The bus is represented by a bold line in FIG. 14. A connection manner between other components is merely an example for description, and is not limited thereto. The bus may be classified into an address bus, a data bus, a control bus, and the like. For ease of representation, only one thick line is used to represent the bus in FIG. 14, but this does not mean that there is only one bus or only one type of bus.

In this embodiment of this application, the processor 1420 may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

In this embodiment of this application, the memory 1430 may be a non-volatile memory, such as a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be noted that the communication apparatus in the foregoing embodiments may be a terminal, a circuit, a chip used in a terminal, or another combined component, component, or the like that has a function of the terminal. When the communication apparatus is a terminal, the transceiver module may be a transceiver, and may include an antenna, a radio frequency circuit, and the like. The processing module may be a processor, for example, a central processing unit (CPU). When the communication apparatus is a component that has a function of the terminal, the transceiver module may be a radio frequency unit, and the processing module may be a processor. When the communication apparatus is a chip system, the transceiver module may be an input/output interface of the chip system, and the processing module may be a processor of the chip system.

Figure 15:
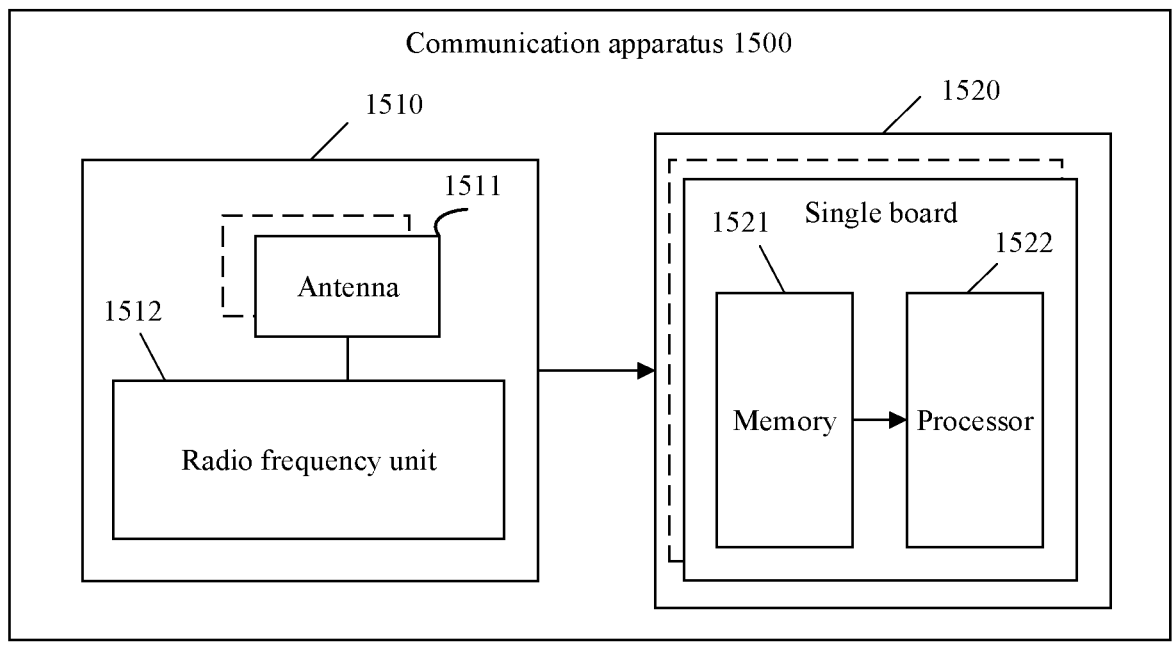
FIG. 15 is a diagram depicting still another structure of a communication apparatus according to an embodiment of this application.

FIG. 15 is a simplified diagram depicting a structure of a communication apparatus. For ease of understanding and illustration, in FIG. 15, an example in which the communication apparatus is a base station is used. The base station may be used in the system shown in FIG. 1, may be the network device in FIG. 1, and performs functions of the network device in the method embodiments.

The communication apparatus 1500 may include a transceiver 1510, a memory 1521, and a processor 1522. The transceiver 1510 may be used by the communication apparatus for communication, for example, configured to send or receive the first indication information or the capability information. The memory 1521 is coupled to the processor 1522, and may be configured to store a program and data that are necessary for implementing functions of the communication apparatus 1500. The processor 1522 is configured to support the communication apparatus 1500 in performing a corresponding function in the method, and the function may be implemented by invoking the program stored in the memory 1521.

The transceiver 1510 may be a wireless transceiver, and may be configured to support the communication apparatus 1500 in sending and receiving signaling and/or data through a radio air interface. The transceiver 1510 may also be referred to as a transceiver unit or a communication unit. The transceiver 1510 may include one or more radio frequency units 1512 and one or more antennas 1511. The radio frequency unit, for example, a remote radio unit (RRU) or an active antenna unit (AAU), may be configured to transmit a radio frequency signal and perform conversion between a radio frequency signal and a baseband signal. The one or more antennas may be configured to radiate and receive a radio frequency signal. Optionally, the transceiver 1510 may include only the foregoing radio frequency unit. In this case, the communication apparatus 1500 may include the transceiver 1510, the memory 1521, the processor 1522, and the antenna 1511.

The memory 1521 and the processor 1522 may be integrated or may be independent of each other. As shown in FIG. 15, the memory 1521 and the processor 1522 may be integrated into a control unit 1520 of the communication apparatus 1500. For example, the control unit 1520 may include a baseband unit (BBU) of an LTE base station, and the baseband unit may also be referred to as a digital unit (DU). Alternatively, the control unit 1520 may include a distributed unit (DU) and/or a centralized unit (CU) in a base station in 5G and future radio access technologies. The control unit 1520 may include one or more antenna panels. A plurality of antenna panels may jointly support a radio access network (for example, an LTE network) of a single access standard, or may separately support radio access networks (for example, an LTE network, a 5G network, or another network) of different access standards. The memory 1521 and the processor 1522 may serve one or more antenna panels. In other words, the memory 1521 and the processor 1522 may be separately disposed on each antenna panel. Alternatively, the plurality of antenna panels may share a same memory 1521 and a same processor 1522. In addition, a necessary circuit may be disposed on each antenna panel. For example, the circuit may be configured to implement coupling between the memory 1521 and the processor 1522. The transceiver 1510, the processor 1522, and the memory 1521 may be connected by using a bus structure and/or another connection medium.

Based on the structure shown in FIG. 15, when the communication apparatus 1500 needs to send data, the processor 1522 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives a radio frequency signal through the antenna, converts the radio frequency signal into a baseband signal, and outputs the baseband signal to the processor 1522. The processor 1522 converts the baseband signal into data, and processes the data.

Based on the structure shown in FIG. 15, the transceiver 1510 may be configured to perform the foregoing steps performed by the transceiver module 1320, and/or the processor 1522 may be configured to invoke instructions in the memory 1521, to perform the steps performed by the processing module 1310.

Figure 16:
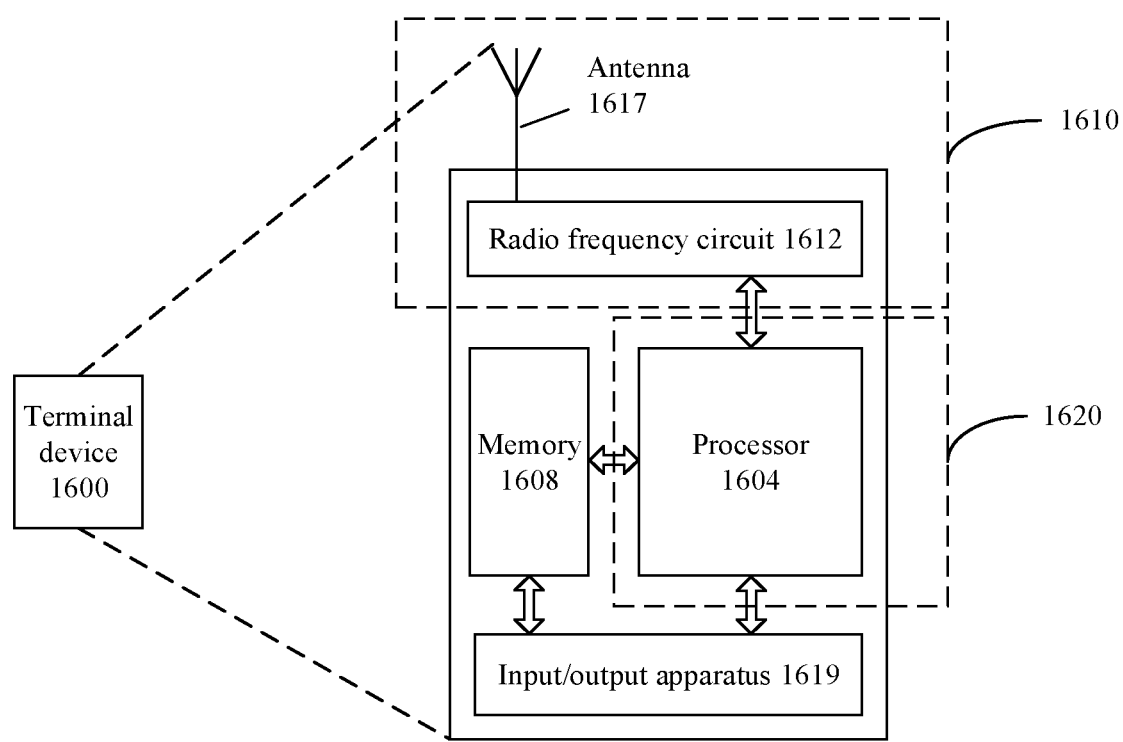
FIG. 16 is a diagram depicting yet another structure of a communication apparatus according to an embodiment of this application.

FIG. 16 is a simplified diagram depicting a structure of a terminal device 1600. For ease of understanding and illustration, an example in which the terminal device 1600 is a mobile phone as used in FIG. 16. As shown in FIG. 16, the terminal device 1600 includes a processor 1604, a memory 1608, a radio frequency circuit 1612, an antenna 1617, and an input/output apparatus 1619. The processor 1604 is mainly configured to: process a communication protocol and communication data, control an on-board unit, execute a software program, and process data of the software program. The memory 1608 is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data input by a user and output data to the user. It should be noted that some types of devices may have no input/output apparatus.

When data needs to be sent, the processor 1604 performs baseband processing on to-be-sent data, and outputs a baseband signal to the radio frequency circuit. The radio frequency circuit performs radio frequency processing on the baseband signal, and then sends a radio frequency signal in a form of an electromagnetic wave through the antenna. When data is sent to the device, the radio frequency circuit receives a radio frequency signal through the antenna, converts the radio frequency signal into a baseband signal, and outputs the baseband signal to the processor 1604. The processor 1604 converts the baseband signal into data, and processes the data. For ease of description, FIG. 16 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver unit of the apparatus, and the processor 1604 having a processing function may be considered as a processing unit of the apparatus. As shown in FIG. 16, the apparatus includes a transceiver unit 1610 and a processing unit 1620. The transceiver unit 1610 may also be referred to as a transceiver, a transceiver machine, a transceiver apparatus, or the like. The processing unit 1620 may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes a sending unit and a receiving unit. The transceiver unit 1610 sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmit circuit, or the like.

It should be understood that the transceiver unit 1610 is configured to perform a sending operation and a receiving operation on a terminal device side in the foregoing method embodiments, and the processing unit 1620 is configured to perform an operation other than the sending and receiving operations of the terminal in the foregoing method embodiments.

For example, in an implementation, the transceiver unit 1610 may be configured to perform S1202, S1203, and S1204 in the embodiment shown in FIG. 12, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. The communication system includes a network device and a terminal device, or may include more network devices and more terminal devices. For example, the communication system includes a network device and a terminal device that are configured to implement related functions in FIG. 12.

The network device is configured to implement functions related to a network part in FIG. 12. The terminal device is configured to implement functions related to a terminal device in FIG. 12. For details, refer to the related descriptions in the method embodiment. Details are not described herein again.

An embodiment of this application further provides a computer-readable storage medium including instructions. When the instructions are run on a computer, the computer is enabled to perform the method performed by the network device in FIG. 12; or when the instructions are run on a computer, the computer is enabled to perform the method performed by the terminal device in FIG. 12.

An embodiment of this application further provides a computer program product including instructions. When the instructions are run on a computer, the computer is enabled to perform the method performed by the network device in FIG. 12; or when the instructions are run on a computer, the computer is enabled to perform the method performed by the terminal device in FIG. 12.

An embodiment of this application provides a chip system. The chip system includes a processor and may further include a memory, to implement functions of the network device or the terminal in the method, or to implement functions of the network device and the terminal in the method. The chip system may include a chip, or may include a chip and another discrete component.

It should be understood that the terms "system" and "network" may be used interchangeably in embodiments of this application. "At least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, the first non-frequency hopping transmission manner and the second non-frequency hopping transmission manner are merely used to distinguish between different non-frequency hopping transmission manners, but do not indicate different priorities, importance levels, or the like of the two non-frequency hopping transmission manners.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, various illustrative logical blocks (illustrative logical block) and steps that are described with reference to the embodiments disclosed in this specification may be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining a first transmission manner from a plurality of transmission manners, and the plurality of transmission manners comprise a non-frequency hopping transmission manner and an intra-slot frequency hopping transmission manner;
   if second indication information is present, and the first transmission manner is the non-frequency hopping transmission manner, receiving the second indication information and determining, based on the second indication information, a rule used to determine a resource block (RB) index of a physical uplink control channel (PUCCH) from a second rule and a third rule;
   wherein a first X number of PUCCH resources are on one side of a bandwidth part (BWP) according to the second rule;
   wherein a second X number of PUCCH resources are on the other side of the BWP according to the third rule, wherein X is an integer; and
   sending the PUCCH to a network device in the first transmission manner;
   wherein the non-frequency hopping transmission manner comprises the PUCCH being transmitted without frequency hopping in a slot, wherein uplink control information (UCI) on the PUCCH is sent by using an orthogonal sequence whose length is L5 symbols, a demodulation reference signal (DMRS) on the PUCCH is sent by using an orthogonal sequence whose length is L6 symbols, and L5 and L6 are integers; and
   wherein the intra-slot frequency hopping transmission manner comprises the PUCCH being transmitted with frequency hopping in a slot.

2. The method according to claim 1, wherein:
   the second rule is $0 \leq r_{PUCCH} \leq X-1$, and an RB index value of the PUCCH is equal to $RB_{BWP}^{offset} + \lfloor r_{PUCCH}/N_{CS} \rfloor$; and
   the third rule is: $0 \leq r_{PUCCH} \leq X-1$, and an RB index value of the PUCCH is equal to $N_{BWP}^{size} - 1 - RB_{BWP}^{offset} - \lfloor r_{PUCCH}/N_{CS} \rfloor$;
   wherein the $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{size}$ is a size of a bandwidth part BWP on which the PUCCH resource is configured.

3. The method according to claim 1, wherein the method further comprises:
   receiving a higher layer signaling comprising the second indication information.

4. The method according to claim 1, wherein:
   the second indication information is indicated by 1 bit; and
   when a bit value of the second indication information is 0, the second indication information indicates that the RB index of the PUCCH is determined according to the second rule; or
   when a bit value of the second indication information is 1, the third rule is used to determine the RB index of the PUCCH based on the second indication information.

5. The method according to claim 1, wherein:
   if second indication information is absent, the RB index of the PUCCH is determined according to a default rule;
   a first X/2 number of PUCCH resources are on one side of the BWP, and a second X/2 number of PUCCH resources are on the other side of the BWP for the default rule.

6. The method according to claim 5, wherein the default rule comprises:
   $0 \leq r_{PUCCH} \leq (X/2)-1$, and an RB index value of the PUCCH is equal to $RB_{BWP}^{offset} + \lfloor r_{PUCCH}/N_{CS} \rfloor$; and
   $X/2 \leq r_{PUCCH} \leq X-1$ and the RB index value of the PUCCH is equal to $N_{BWP}^{size} - 1 - RB_{BWP}^{offset} - \lfloor (r_{PUCCH}-8)/N_{CS} \rfloor$.

7. The method according to claim 1, wherein X=16.

8. The method according to claim 1, wherein:
   whether the second indication information is present is determined based on an identification information.

9. The method according to claim 1, wherein the method further comprises:
   receiving a first indication information, wherein the first indication information indicates the first transmission manner.

10. The method according to claim 1, wherein:
    the first indication information occupies 1 bit; and
    when a bit value of the first indication information is 0, the first indication information indicates that the first transmission manner is the non-frequency hopping transmission manner;
    when a bit value of the first indication information is 1, the first indication information indicates that the first transmission manner is the intra-slot frequency hopping transmission manner.

11. The method according to claim 1, wherein:
    the one side of the BWP indicates starting from a lowest frequency location of the BWP;
    the other side of the BWP indicates starting from a highest frequency location of the BWP.

12. An apparatus, comprising:
    a memory storing instructions; and
    at least one processor in communication with the memory, the at least one processor configured, upon execution of the instructions, to perform the following steps:
    determining a first transmission manner from a plurality of transmission manners, and the plurality of transmission manners comprise a non-frequency hopping transmission manner and an intra-slot frequency hopping transmission manner;
    if second indication information is present, and the first transmission manner is the non-frequency hopping transmission manner, receiving the second indication information, and determining, based on the second indication information, a rule used to determine a resource block (RB) index of a physical uplink control channel (PUCCH) from a second rule and a third rule;
    wherein a first X number of PUCCH resources are on one side of a bandwidth part (BWP) according to the second rule;

wherein a second X number of PUCCH resources are on the other side of the BWP according to the third rule, wherein X is an integer; and sending the PUCCH to a network device in the first transmission manner;

wherein the non-frequency hopping transmission manner comprises the PUCCH being transmitted without frequency hopping in a slot, wherein uplink control information (UCI) on the PUCCH is sent by using an orthogonal sequence whose length is L5 symbols, a demodulation reference signal (DMRS) on the PUCCH is sent by using an orthogonal sequence whose length is L6 symbols, and L5 and L6 are integers; and wherein the intra-slot frequency hopping transmission manner comprises the PUCCH being transmitted with frequency hopping in a slot.

13. The apparatus according to claim 12, wherein:

the second rule is $0 \leq r_{PUCCH} \leq X-1$, and an RB index value of the PUCCH is equal to $RB_{BWP}^{offset} + \lfloor r_{PUCCH}/N_{CS} \rfloor$; and the third rule is: $0 \leq r_{PUCCH} \leq X-1$, and an RB index value of the PUCCH is equal to $N_{BWP}^{size} - 1 - RB_{BWP}^{offset} - \lfloor r_{PUCCH}/N_{CS} \rfloor$;

wherein the $r_{PUCCH}$ is a PUCCH resource index, $N_{CS}$ is a quantity of cyclic shifts of a PUCCH resource set, $RB_{BWP}^{offset}$ is a frequency domain offset value of the PUCCH resource set, $N_{BWP}^{Size}$ is a size of a bandwidth part BWP on which the PUCCH resource is configured.

14. The apparatus according to claim 12, wherein:

the second indication information is indicated by 1 bit; and when a bit value of the second indication information is 0, the second indication information indicates the RB index of the PUCCH is determined according to the second rule; or when a bit value of the second indication information is 1, the third rule is used to determine the RB index of the PUCCH based on the second indication information.

15. The apparatus according to claim 12, wherein:

if second indication information is absent, the RB index of the PUCCH is determined according to a default rule;

a first X/2 number of PUCCH resources are on one side of the BWP, and a second X/2 number of PUCCH resources are on the other side of the BWP for the default rule.

16. The apparatus according to claim 12, wherein the default rule comprises:

$0 \leq r_{PUCCH} \leq (X/2)-1$, and an RB index value of the PUCCH is equal to $RB_{BWP}^{offset} + \lfloor r_{PUCCH}/N_{CS} \rfloor$; and $X/2 \leq r_{PUCCH} \leq X-1$ and the RB index value of the PUCCH is equal to $N_{BWP}^{size} - 1 - RB_{BWP}^{offset} - \lfloor (r_{PUCCH}-8)/N_{CS} \rfloor$.

17. The apparatus according to claim 12, wherein X=16.

18. The apparatus according to claim 12, wherein:

whether the second indication information is present is determined based on an identification information.

19. The apparatus according to claim 12, wherein:

the one side of the BWP indicates starting from a lowest frequency location of the BWP;

the other side of the BWP indicates starting from a highest frequency location of the BWP.

20. A non-transitory computer-readable media storing computer instructions that configure at least one processor, upon execution of the instructions, to perform the following steps:

determining a first transmission manner from a plurality of transmission manners, and the plurality of transmission manners comprise a non-frequency hopping transmission manner and an intra-slot frequency hopping transmission manner;

if second indication information is present, and the first transmission manner is the non-frequency hopping transmission manner, receiving the second indication information, and determining, based on the second indication information, a rule used to determine a resource block (RB) index of a physical uplink control channel (PUCCH) from a second rule and a third rule;

wherein a first X number of PUCCH resources are on one side of a bandwidth part (BWP) according to the second rule;

wherein a second X number of PUCCH resources are on the other side of the BWP according to the third rule, wherein X is an integer; and sending the PUCCH to a network device in the first transmission manner;

wherein the non-frequency hopping transmission manner comprises the PUCCH being transmitted without frequency hopping in a slot, wherein uplink control information (UCI) on the PUCCH is sent by using an orthogonal sequence whose length is L5 symbols, a demodulation reference signal (DMRS) on the PUCCH is sent by using an orthogonal sequence whose length is L6 symbols, and L5 and L6 are integers; and wherein the intra-slot frequency hopping transmission manner comprises the PUCCH being transmitted with frequency hopping in a slot.

* * * * *